United States Patent
Kim et al.

(10) Patent No.: US 9,345,931 B2
(45) Date of Patent: May 24, 2016

(54) GOLF BALL

(71) Applicant: DUNLOP SPORTS CO. LTD., Kobe-shi, Hyogo (JP)

(72) Inventors: Hyoungchol Kim, Kobe (JP); Masahide Onuki, Kobe (JP)

(73) Assignee: DUNLOP SPORTS CO. LTD., Kobe-Shi (JP)

( * ) Notice: Subject to any disclaimer, the term of this patent is extended or adjusted under 35 U.S.C. 154(b) by 228 days.

(21) Appl. No.: 14/100,804

(22) Filed: Dec. 9, 2013

(65) Prior Publication Data

US 2014/0187356 A1  Jul. 3, 2014

(30) Foreign Application Priority Data

Dec. 28, 2012  (JP) ................. 2012-286541

(51) Int. Cl.
*A63B 37/14* (2006.01)
*A63B 37/00* (2006.01)
*G06T 17/20* (2006.01)

(52) U.S. Cl.
CPC ............ *A63B 37/0006* (2013.01); *A63B 37/002* (2013.01); *A63B 37/0007* (2013.01); *A63B 37/0008* (2013.01); *A63B 37/0009* (2013.01); *A63B 37/009* (2013.01); *A63B 37/0012* (2013.01); *A63B 37/0089* (2013.01); *A63B 37/0096* (2013.01); *G06T 17/20* (2013.01); *A63B 37/0018* (2013.01); *A63B 37/0021* (2013.01)

(58) Field of Classification Search
CPC ........... A63B 37/0007; A63B 37/0008; A63B 37/0009; A63B 37/001
USPC .................................................. 473/351–378
See application file for complete search history.

(56) References Cited

U.S. PATENT DOCUMENTS

| 4,720,111 | A | * | 1/1988 | Yamada | A63B 37/0004 473/382 |
| 5,601,503 | A | * | 2/1997 | Yamagishi | A63B 37/0004 473/280 |
| 5,820,492 | A | * | 10/1998 | Yamagishi | A63B 37/0003 473/372 |
| 5,935,023 | A | * | 8/1999 | Maehara | A63B 37/0004 473/379 |

(Continued)

FOREIGN PATENT DOCUMENTS

| GB | 2 296 447 A | 7/1996 |
| WO | WO 01/36053 A1 | 5/2001 |
| WO | WO 02/13916 A2 | 2/2002 |

OTHER PUBLICATIONS

Livingston, "Euclidean Voronoi Diagrams for Circles in a Circle", CMPT 463, Apr. 3, 2008, pp. 1-10, XP2720978.

*Primary Examiner* — John E Simms, Jr.
(74) *Attorney, Agent, or Firm* — Birch, Stewart, Kolasch & Birch, LLP

(57) ABSTRACT

A golf ball 2 has a large number of dimples 8 on a surface thereof. A trajectory of the golf ball 2 is divided into first to fourth segments. An average CD1 of drag coefficients CD and an average CL1 of lift coefficients CL in the first segment are equal to or less than 0.225 and 0.180, respectively. An average CD2 of drag coefficients CD and an average CL2 of lift coefficients CL in the second segment are equal to or less than 0.250 and 0.220, respectively. An average CD3 of drag coefficients CD and an average CL3 of lift coefficients CL in the third segment are equal to or greater than 0.260 and 0.220, respectively. An average CD4 of drag coefficients CD and an average CL4 of lift coefficients CL in the fourth segment are equal to or greater than 0.250 and 0.200, respectively.

6 Claims, 26 Drawing Sheets

(56) References Cited

U.S. PATENT DOCUMENTS

| | | | | |
|---|---|---|---|---|
| 6,409,615 B1 * | 6/2002 | McGuire | A63B 37/0004 473/383 |
| 6,464,601 B2 * | 10/2002 | Ogg | A63B 37/0004 473/383 |
| 6,537,159 B2 * | 3/2003 | Ogg | A63B 37/0004 473/383 |
| 6,602,153 B2 * | 8/2003 | Ogg | A63B 37/0004 473/383 |
| 6,729,976 B2 * | 5/2004 | Bissonnette | A63B 37/0004 473/383 |
| 6,916,255 B2 * | 7/2005 | Aoyama | A63B 37/0004 473/383 |
| 8,002,647 B2 * | 8/2011 | Sato | A63B 37/0004 473/383 |
| 8,512,166 B2 * | 8/2013 | Sullivan | A63B 37/0004 473/378 |
| 8,821,320 B2 * | 9/2014 | Sato | A63B 37/0004 473/383 |
| 2009/0298618 A1 | 12/2009 | Kim et al. | |

* cited by examiner

GOLF BALL

This application claims priority on Patent Application No. 2012-286541 filed in JAPAN on Dec. 28, 2012. The entire contents of this Japanese Patent Application are hereby incorporated by reference.

BACKGROUND OF THE INVENTION

1. Field of the Invention

The present invention relates to golf balls. Specifically, the present invention relates to improvement of dimples of golf balls.

2. Description of the Related Art

Golf balls have a large number of dimples on the surface thereof. The dimples disturb the air flow around the golf ball during flight to cause turbulent flow separation. By causing the turbulent flow separation, separation points of the air from the golf ball shift backwards. The turbulent flow separation promotes the displacement between the separation point on the upper side and the separation point on the lower side of the golf ball which results from the backspin.

A drag coefficient CD and a lift coefficient CL influence a trajectory of a golf ball. The United States Golf Association (USGA) has released a manual for a trajectory calculation program. By inputting a drag coefficient CD and a lift coefficient CL to a program that complies with the manual, a flight distance of a golf ball can be predicted. The drag coefficient CD and the lift coefficient CL are measured through the ITR (Indoor Test Range) specified in the rule of the USGA.

US2007/0093319 discloses a golf ball in which a lift force falls within a predetermined range at a Reynolds Number of 205000 and a spin rate of 2900 rpm.

US2007/0093320 discloses a golf ball in which a drag coefficient CD and a lift coefficient CL fall within predetermined ranges at a Reynolds Number of 230000 and a spin ratio of 0.085.

The drag coefficient CD and the lift coefficient CL change moment by moment from a launch point to a landing point. In the golf ball disclosed in US2007/0093319, the lift force at one time point in a trajectory is merely set within the predetermined range. Evaluation regarding the flight performance of the golf ball is not sufficient. In the golf ball disclosed in US2007/0093320, the drag coefficient CD and the lift coefficient CL at one time point in a trajectory are merely set within the predetermined ranges. Evaluation regarding the flight performance of the golf ball is also not sufficient.

An object of the present invention is to provide a golf ball having excellent flight performance.

SUMMARY OF THE INVENTION

A golf ball according to the present invention has a large number of dimples on a surface thereof. In the golf ball, when a trajectory that is calculated under conditions of a ball initial speed of 57.4 m/s, a launch angle of 13.3°, and an initial backspin rate of 2450 rpm by a program created according to a manual provided by the USGA using a drag coefficient CD and a lift coefficient CL obtained through an ITR, is divided into a first segment, a second segment, a third segment, and a fourth segment, an average of drag coefficients CD and an average of lift coefficients CL in each segment are as follows.

Average CD1 of drag coefficients CD in the first segment: equal to or less than 0.225

Average CL1 of lift coefficients CL in the first segment: equal to or less than 0.180

Average CD2 of drag coefficients CD in the second segment: equal to or less than 0.250

Average CL2 of lift coefficients CL in the second segment: equal to or less than 0.220

Average CD3 of drag coefficients CD in the third segment: equal to or greater than 0.260

Average CL3 of lift coefficients CL in the third segment: equal to or greater than 0.220

Average CD4 of drag coefficients CD in the fourth segment: equal to or greater than 0.250

Average CL4 of lift coefficients CL in the fourth segment: equal to or greater than 0.200

The first segment is a segment from a launch point to a midpoint between the launch point and a top. The second segment is a segment from the midpoint between the launch point and the top to the top. The third segment is a segment from the top to a midpoint between the top and a landing point. The fourth segment is a segment from the midpoint between the top and the landing point to the landing point.

In the golf ball according to the present invention, the drag coefficients CD and the lift coefficients CL from the launch point to the landing point are appropriate. The golf ball has excellent flight performance.

Preferably, a contour shape of each dimple is non-circular. Preferably, each dimple is obtained based on a contour of a Voronoi region assumed on a surface of a phantom sphere of the golf ball.

Preferably, a pattern of the dimples is obtained by a designing process comprising the steps of:

(1) assuming a large number of circles on the surface of the phantom sphere;

(2) assuming a large number of generating points based on positions of the large number of circles;

(3) assuming a large number of Voronoi regions on the surface of the phantom sphere by a Voronoi tessellation based on the large number of generating points; and (4) assigning a dimple and a land to the surface of the phantom sphere based on contours of the large number of Voronoi regions.

Preferably, a radius variation range Rh of each dimple is equal to or greater than 0.4 mm. Preferably, each dimple meets the following mathematical formula.

$$Rh/Rave \geq 0.25$$

In the mathematical formula, Rh represents a radius variation range, and Rave represents an average radius.

Preferably, a difference between a radius variation range Rhmax of a dimple having a maximum radius variation range Rh and a radius variation range Rhmin of a dimple having a minimum radius variation range Rh is equal to or greater than 0.1 mm.

Preferably, the golf ball meets the following mathematical formula.

$$(Rhmax - Rhmin) > (R1 - R2)$$

In the mathematical formula, Rhmax represents a radius variation range of a dimple having a maximum radius variation range Rh, Rhmin represents a radius variation range of a dimple having a minimum radius variation range Rh, R1 represents an average radius of the dimple having a maximum radius variation range Rh, and R2 represents an average radius of the dimple having a minimum radius variation range Rh.

DESCRIPTION OF THE PREFERRED EMBODIMENTS

The following will describe in detail the present invention based on preferred embodiments with reference to the accompanying drawings.

Figure 1:
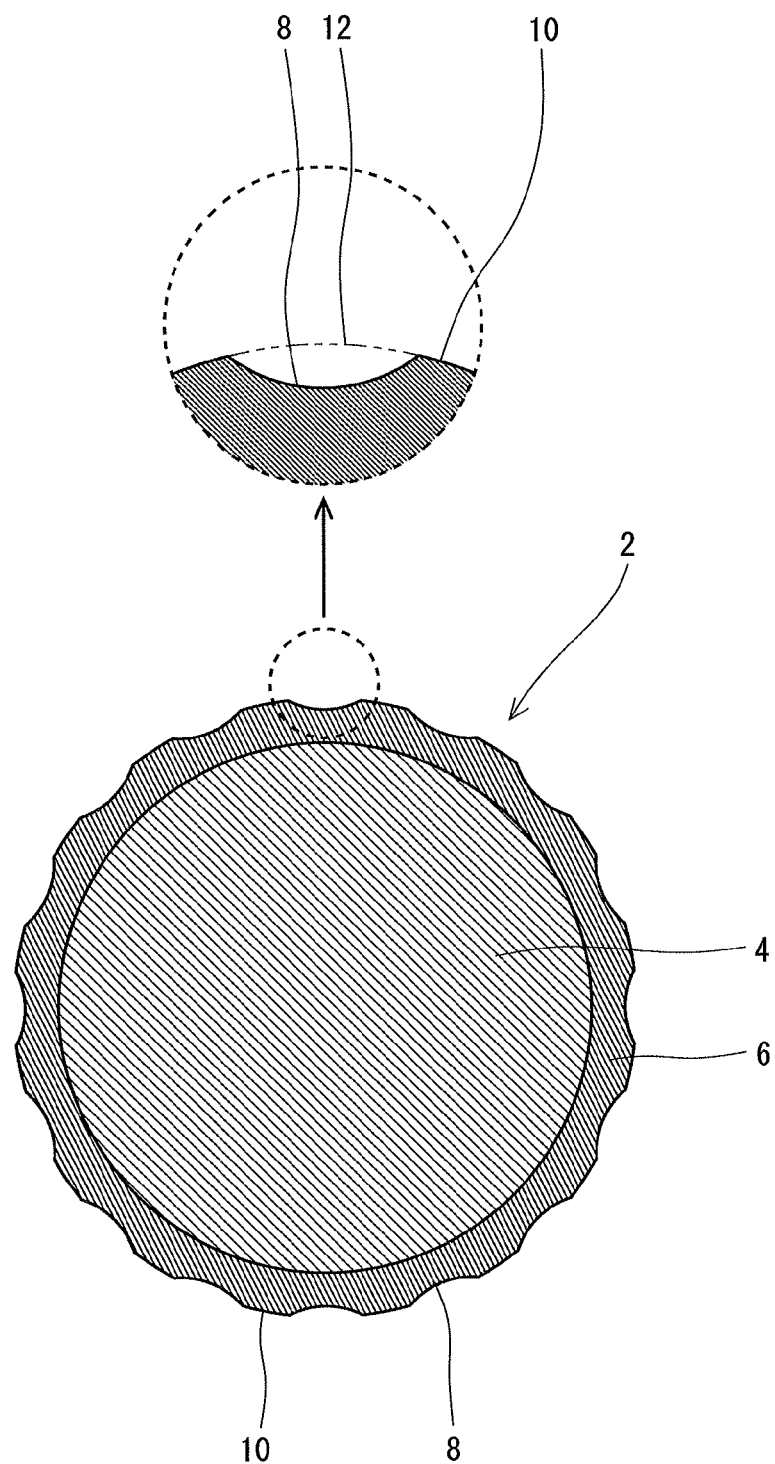
FIG. 1 is a schematic cross-sectional view of a golf ball according to one embodiment of the present invention.

A golf ball 2 shown in FIG. 1 includes a spherical core 4 and a cover 6. On the surface of the cover 6, a large number of dimples 8 are formed. Of the surface of the golf ball 2, a part other than the dimples 8 is a land 10. The golf ball 2 includes a paint layer and a mark layer on the external side of the cover 6 although these layers are not shown in the drawing. A mid layer may be provided between the core 4 and the cover 6.

The golf ball 2 has a diameter of preferably 40 mm or greater but 45 mm or less. From the standpoint of conformity to the rules established by the United States Golf Association (USGA), the diameter is particularly preferably equal to or greater than 42.67 mm. In light of suppression of air resistance, the diameter is more preferably equal to or less than 44 mm and particularly preferably equal to or less than 42.80 mm. The golf ball 2 has a weight of preferably 40 g or greater but 50 g or less. In light of attainment of great inertia, the weight is more preferably equal to or greater than 44 g and particularly preferably equal to or greater than 45.00 g. From the standpoint of conformity to the rules established by the USGA, the weight is particularly preferably equal to or less than 45.93 g.

The core 4 is formed by crosslinking a rubber composition. Examples of base rubbers for use in the rubber composition include polybutadienes, polyisoprenes, styrene-butadiene copolymers, ethylene-propylene-diene copolymers, and natural rubbers. Two or more rubbers may be used in combination. In light of resilience performance, polybutadienes are preferred, and, high-cis polybutadienes are particularly preferred.

In order to crosslink the core 4, a co-crosslinking agent can be used. Examples of preferable co-crosslinking agents in light of resilience performance include zinc acrylate, magnesium acrylate, zinc methacrylate, and magnesium methacrylate. Preferably, the rubber composition includes an organic peroxide together with a co-crosslinking agent. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide.

According to need, various additives such as sulfur, a sulfur compound, a filler, an anti-aging agent, a coloring agent, a plasticizer, a dispersant, and the like are included in the rubber composition of the core 4 in an adequate amount. Crosslinked rubber powder or synthetic resin powder may also be included in the rubber composition.

The core 4 has a diameter of preferably 30.0 mm or greater and particularly preferably 38.0 mm or greater. The diameter of the core 4 is preferably equal to or less than 42.0 mm and particularly preferably equal to or less than 41.5 mm. The core 4 may be composed of two or more layers. The core 4 may have a rib on its surface. The core 4 may be hollow.

A suitable polymer for the cover 6 is an ionomer resin. Examples of preferable ionomer resins include binary copolymers formed with an α-olefin and an α, β-unsaturated carboxylic acid having 3 to 8 carbon atoms. Examples of other preferable ionomer resins include ternary copolymers formed with: an α-olefin; an α, β-unsaturated carboxylic acid having 3 to 8 carbon atoms; and an α, β-unsaturated carboxylate ester having 2 to 22 carbon atoms. For the binary copolymers and ternary copolymers, preferable α-olefins are ethylene and propylene, while preferable α, β-unsaturated carboxylic acids are acrylic acid and methacrylic acid. In the binary copolymers and ternary copolymers, some of the carboxyl groups are neutralized with metal ions. Examples of metal ions for use in neutralization include sodium ion, potassium ion, lithium ion, zinc ion, calcium ion, magnesium ion, aluminum ion, and neodymium ion.

Another polymer may be used instead of or together with an ionomer resin. Examples of the other polymer include thermoplastic polyurethane elastomers, thermoplastic styrene elastomers, thermoplastic polyamide elastomers, thermoplastic polyester elastomers, and thermoplastic polyolefin elastomers. In light of spin performance, thermoplastic polyurethane elastomers are preferred.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the cover 6 in an adequate amount. For the purpose of adjusting specific gravity, powder of a metal with a high specific gravity such as tungsten, molybdenum, and the like may be included in the cover 6.

The cover 6 has a thickness of preferably 0.1 mm or greater and particularly preferably 0.3 mm or greater. The thickness of the cover 6 is preferably equal to or less than 2.5 mm and particularly preferably equal to or less than 2.2 mm. The cover 6 has a specific gravity of preferably 0.90 or greater and particularly preferably 0.95 or greater. The specific gravity of the cover 6 is preferably equal to or less than 1.10 and particularly preferably equal to or less than 1.05. The cover 6 may be composed of two or more layers.

Figure 2:
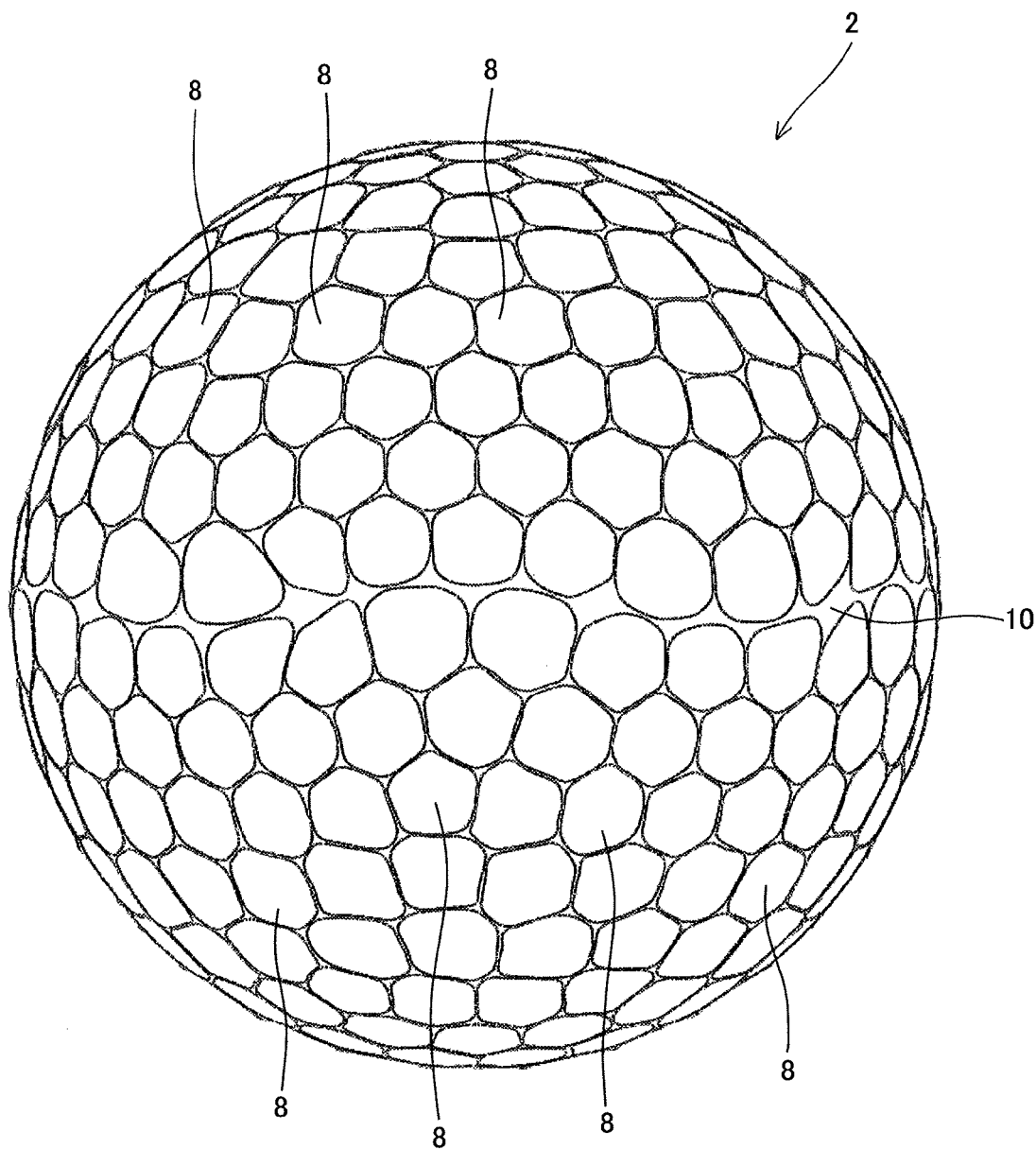
FIG. 2 is an enlarged front view of the golf ball in FIG. 1.
Figure 3:
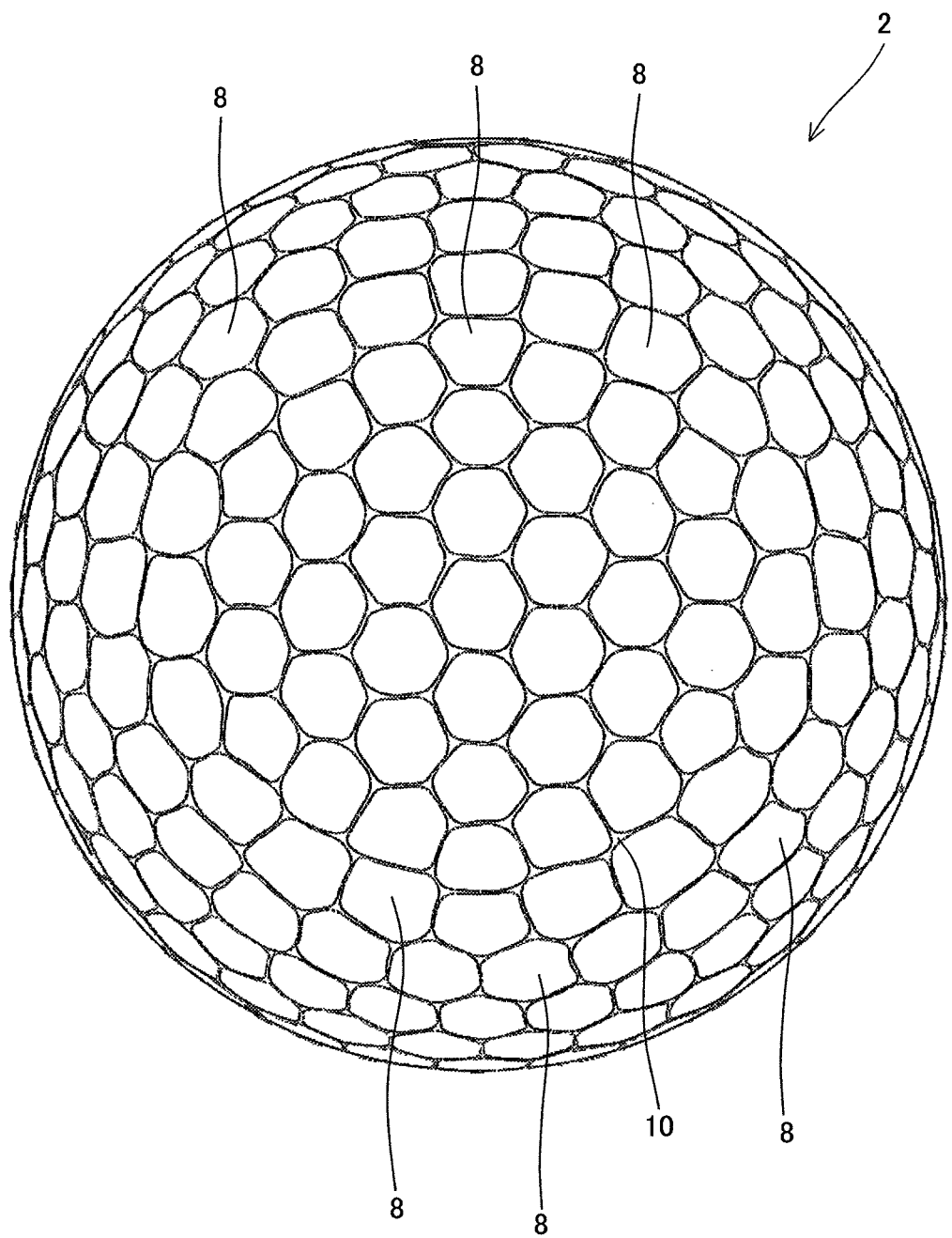
FIG. 3 is a plan view of the golf ball in FIG. 2.

FIG. 2 is an enlarged front view of the golf ball 2 in FIG. 1. FIG. 3 is a plan view of the golf ball 2 in FIG. 2. As is obvious from FIGS. 2 and 3, the golf ball 2 has a large number of non-circular dimples 8. By these dimples 8 and the land 10, a rugged pattern is formed on the surface of the golf ball 2.

In a process for designing the rugged pattern, a Voronoi tessellation is used. In the designing process, a large number of generating points are arranged on the surface of a phantom sphere 12 (see FIG. 1). A large number of regions are assumed on the surface of the phantom sphere 12 based on the generating points by the Voronoi tessellation. In the present specification, these regions are referred to as "Voronoi regions". Dimples 8 and a land 10 are assigned based on the contours of these Voronoi regions. The designing process is preferably executed using a computer and software in light of efficiency. Of course, the present invention is practicable even by hand calculation. The essence of the present invention is not in a computer and software. The following will describe the designing process in detail.

Figure 4:
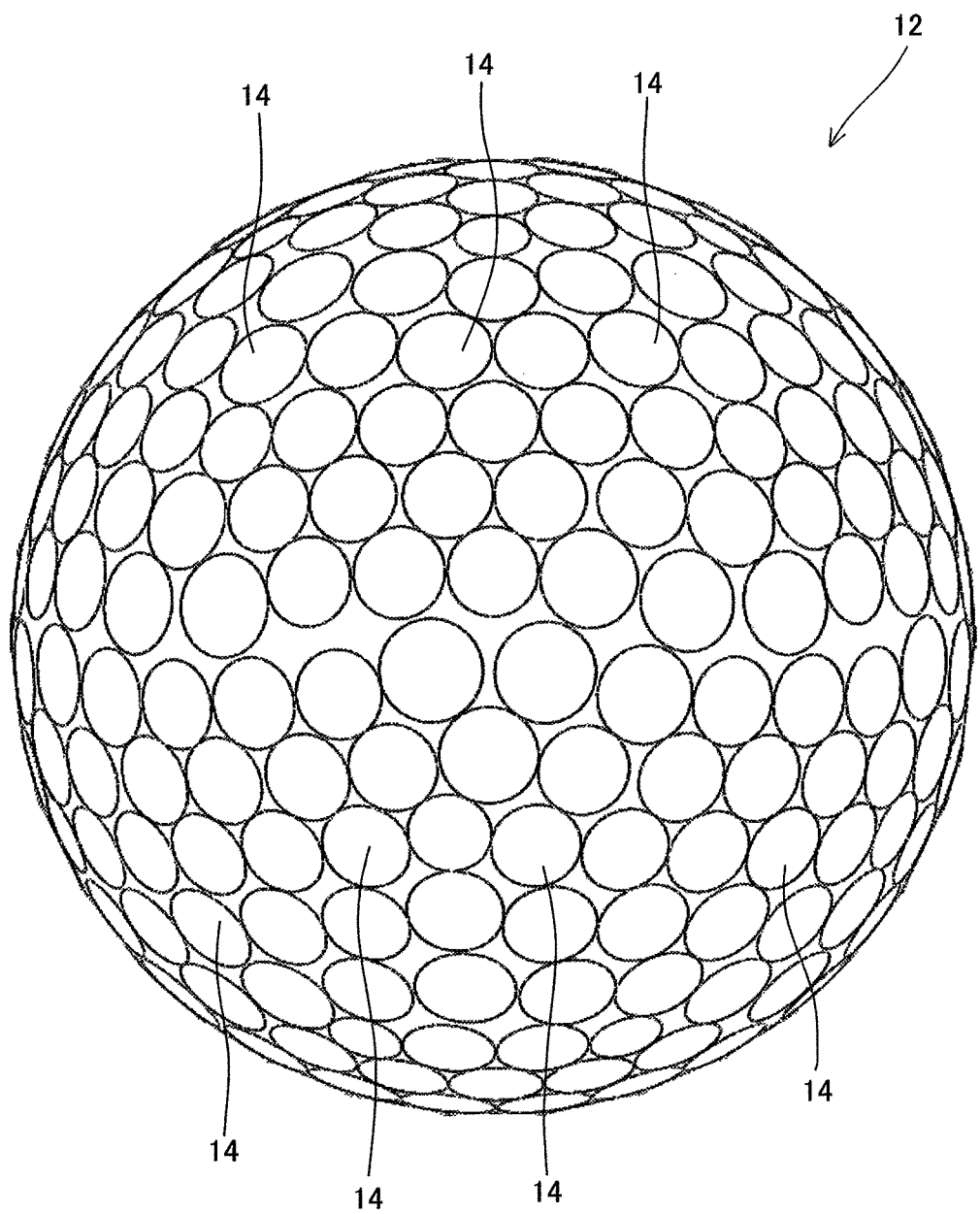
FIG. 4 is a front view of a phantom sphere in which a large number of circles are assumed on a surface thereof.
Figure 5:
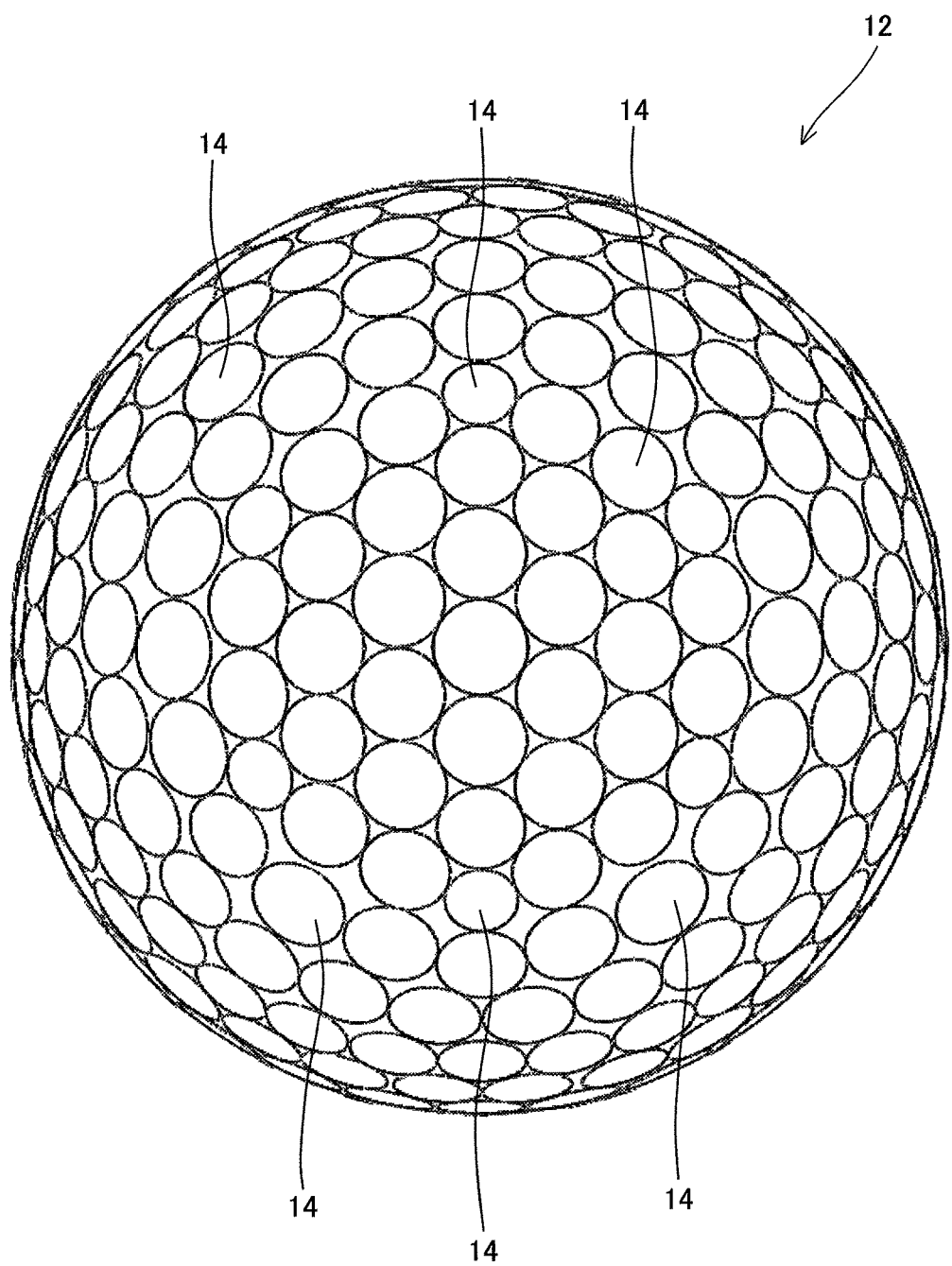
FIG. 5 is a plan view of the phantom sphere in FIG. 4.

In the designing process, as shown in FIGS. 4 and 5, a large number of circles 14 are assumed on the surface of the phantom sphere 12. The method for assuming these circles 14 is the same as a process for designing a dimple pattern having circular dimples. The process for designing a dimple pattern having circular dimples is well known to one skilled in the art. Each of the circles 14 coincides with the contour of a circular dimple. In the present embodiment, the number of the circles 14 is 344.

Figure 6:
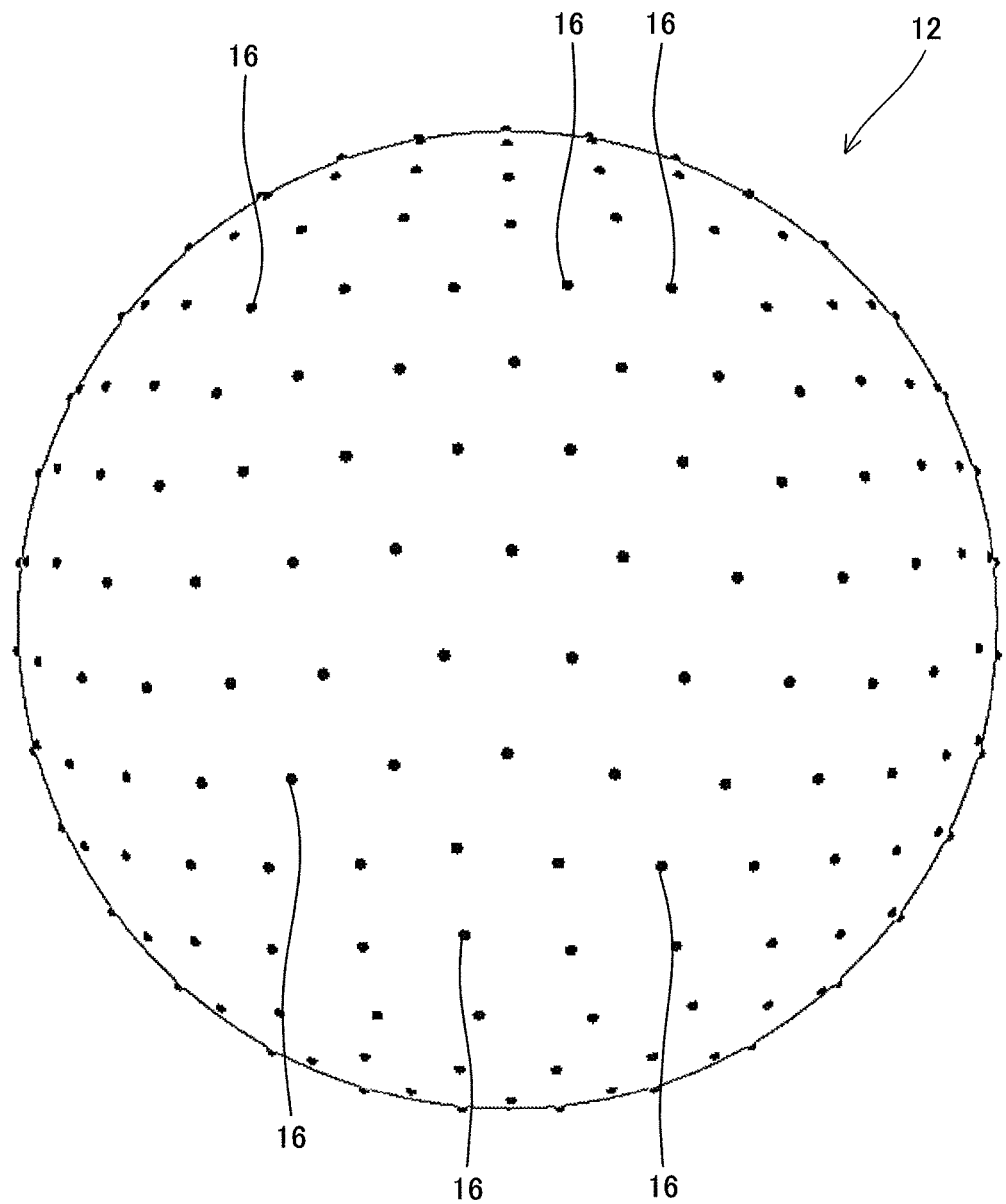
FIG. 6 is a front view of a phantom sphere in which a large number of generating points are assumed on a surface thereof.
Figure 7:
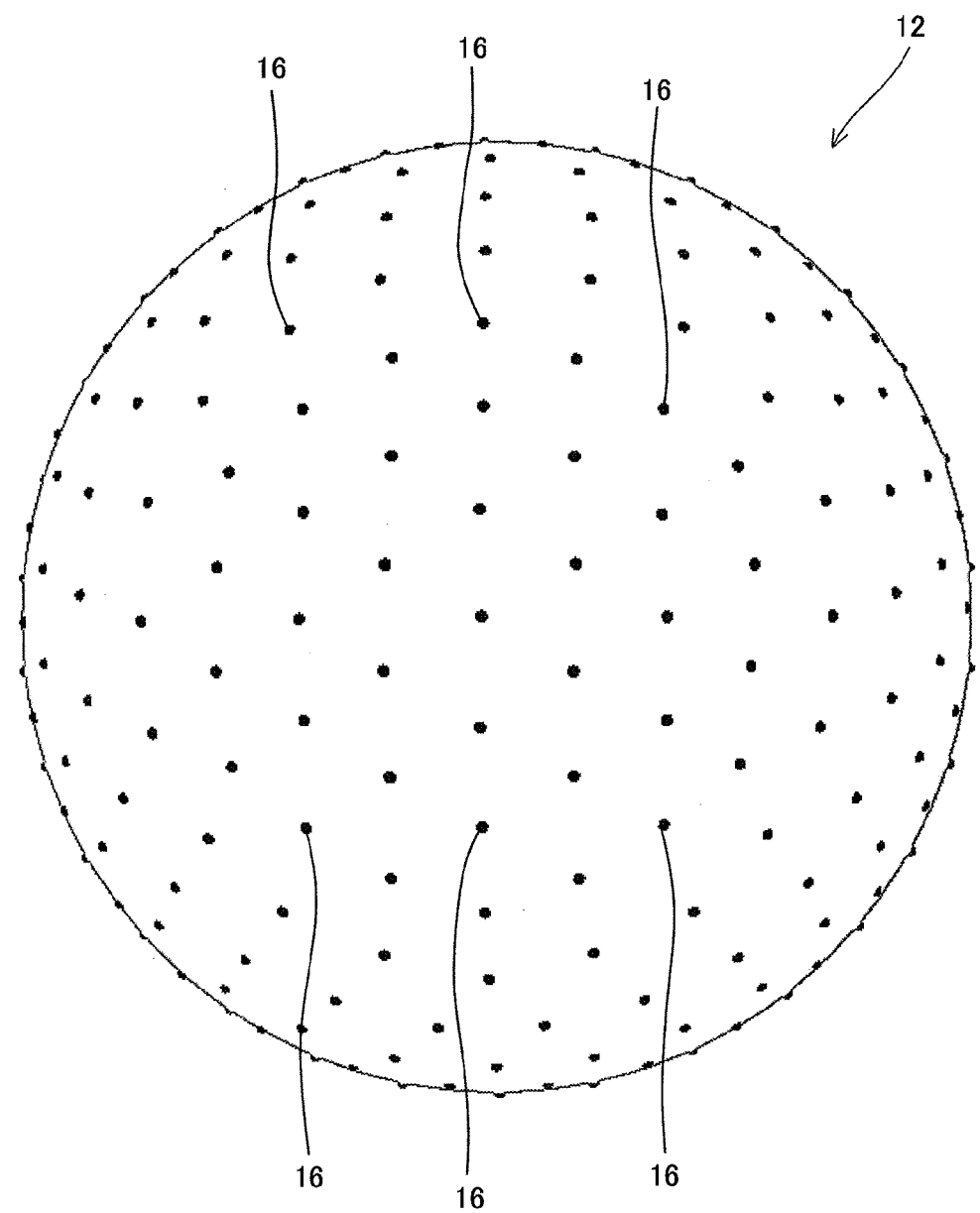
FIG. 7 is a plan view of the phantom sphere in FIG. 6.

A large number of generating points are assumed on the surface of the phantom sphere 12 based on the positions of these circles 14. In the present embodiment, the center of each circle 14 is assumed as a generating point. FIGS. 6 and 7 show these generating points 16. In the present embodiment, since the number of the circles 14 is 344, the number of the generating points 16 is 344.

Figure 8:
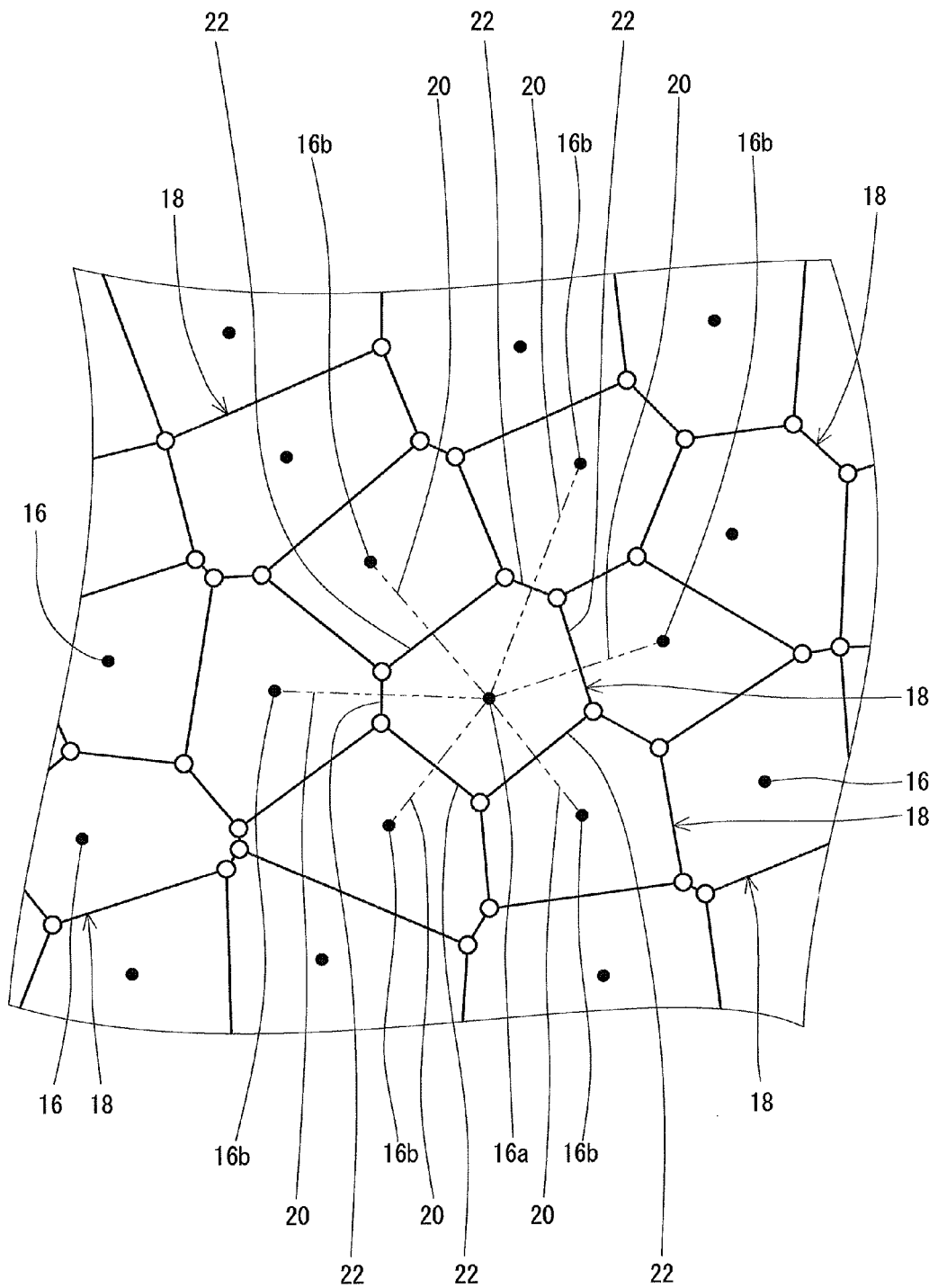
FIG. 8 is an enlarged view showing the generating points in FIG. 6 with Voronoi regions.

A large number of Voronoi regions are assumed based on these generating points 16. FIG. 8 shows the Voronoi regions 18. In FIG. 8, a generating point 16a is adjacent to six generating points 16b. What is indicated by each reference sign 20 is a line segment connecting the generating point 16a to the generating point 16b. FIG. 8 shows six line segments 20. What is indicated by each reference sign 22 is the perpendicular bisector of each line segment 20. The generating point 16a is surrounded by six perpendicular bisectors 22. What is indicated by each outline circle in FIG. 8 is the intersection point between a perpendicular bisector 22 and another perpendicular bisector 22. A point obtained by projecting the intersection point onto the surface of the phantom sphere 12 is a vertex of a spherical polygon (e.g., a spherical hexagon). This projection is performed by light emitted from the center of the phantom sphere 12. The spherical polygon is a Voronoi region 18. The surface of the phantom sphere 12 is divided into a large number of the Voronoi regions 18. The method for the division is referred to as a Voronoi tessellation. In the present embodiment, since the number of the generating points 16 is 344, the number of the Voronoi regions 18 is 344.

Figure 9:
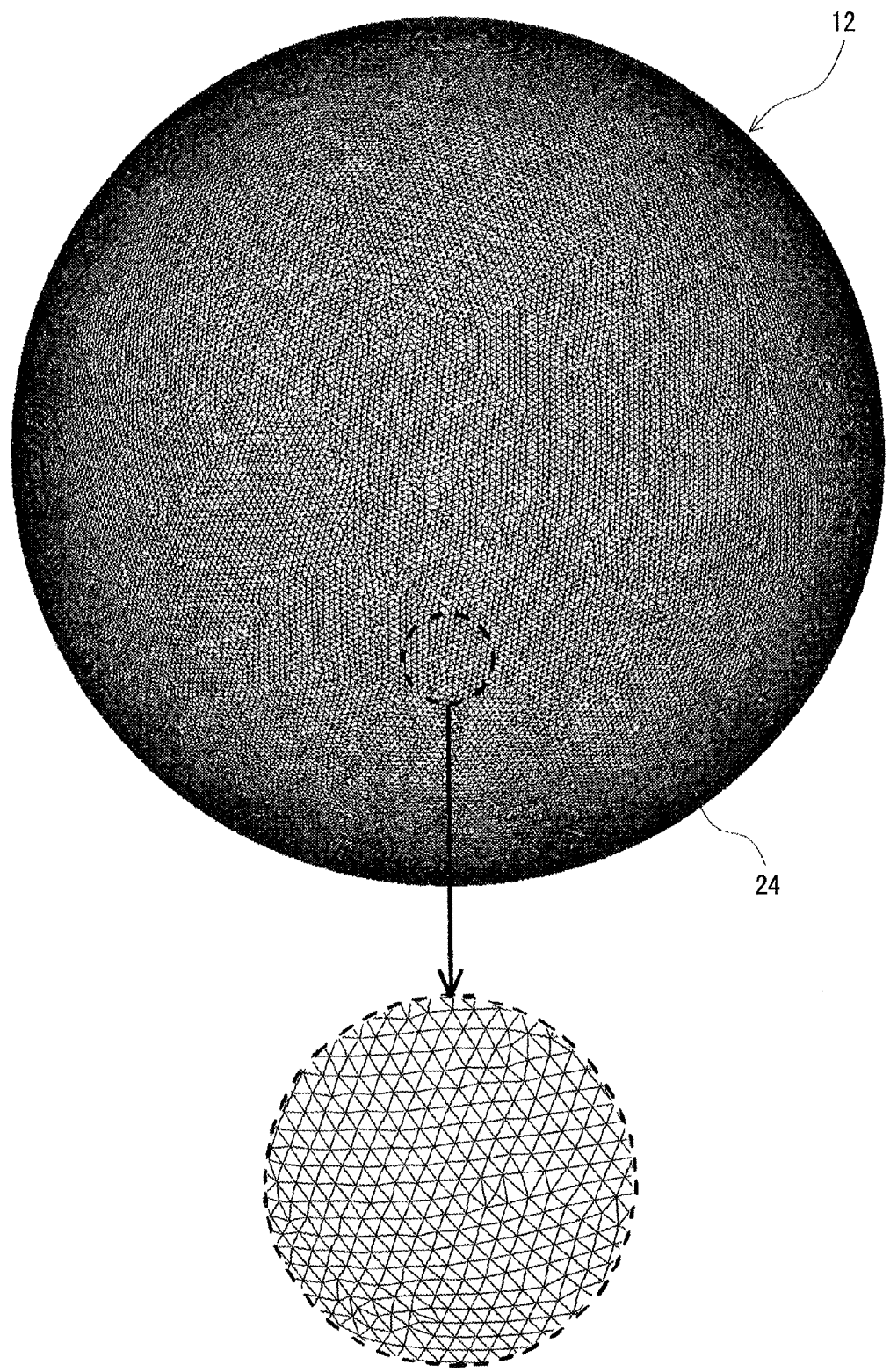
FIG. 9 is a front view of a mesh used in a Voronoi tessellation.

Calculation for defining the contour of each Voronoi region 18 based on the perpendicular bisectors 22 is complicated. The following will describe a method for simply obtaining Voronoi regions 18. In the method, the surface of the phantom sphere 12 is divided into a large number of spherical triangles. This division is performed based on an advancing front method. The advancing front method is disclosed at Pages 195 to 197 of "Daigakuin Johoshorikogaku 3, Keisan Rikigaku (Information Science and Technology for Graduate School 3, Computational Dynamics)" (edited by Koichi ITO, published by Kodansha Ltd.). A mesh 24 shown in FIG. 9 is obtained by this division. The mesh 24 has 314086 triangles and 157045 vertices. Each vertex is defined as a cell (or the center of a cell). The mesh 24 has 157045 cells. The phantom sphere 12 may be divided by other methods. The number of the cells is preferably equal to or greater than 10000 and particularly preferably equal to or greater than 100000.

The distances between each cell in the mesh 24 and all the generating points 16 are calculated. For each cell, distances of which the number is the same as the number of the generating points 16 are calculated. The shortest distance is selected from among these distances. The cell is associated with the generating point 16 on which the shortest distance is based. In other words, the generating point 16 that is closest to the cell is selected. It is noted that calculation of the distances between the cell and the generating points 16 whose distances from the cell are obviously large may be omitted.

Figure 10:
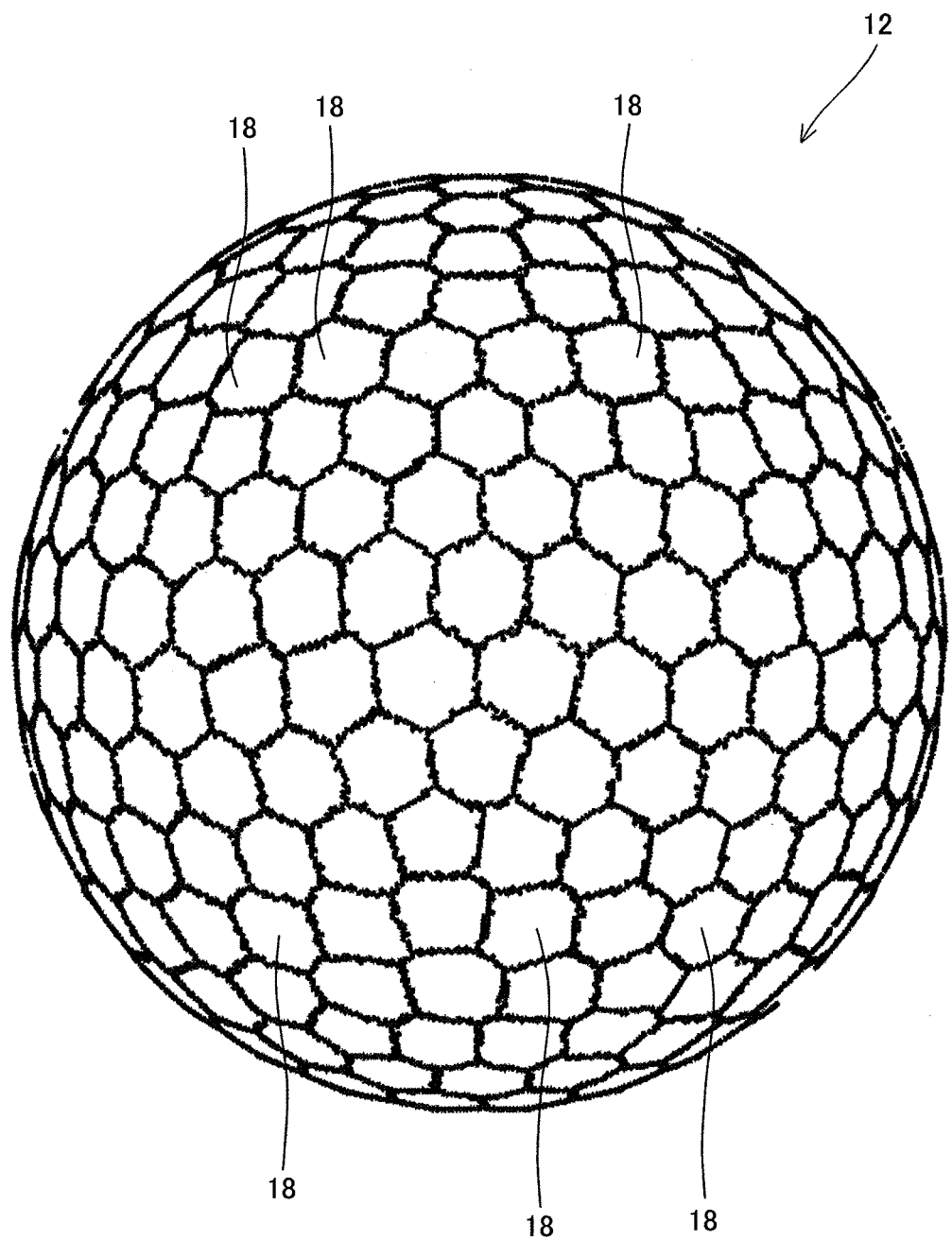
FIG. 10 is a front view of a phantom sphere in which Voronoi regions obtained by a simple method are assumed.
Figure 11:
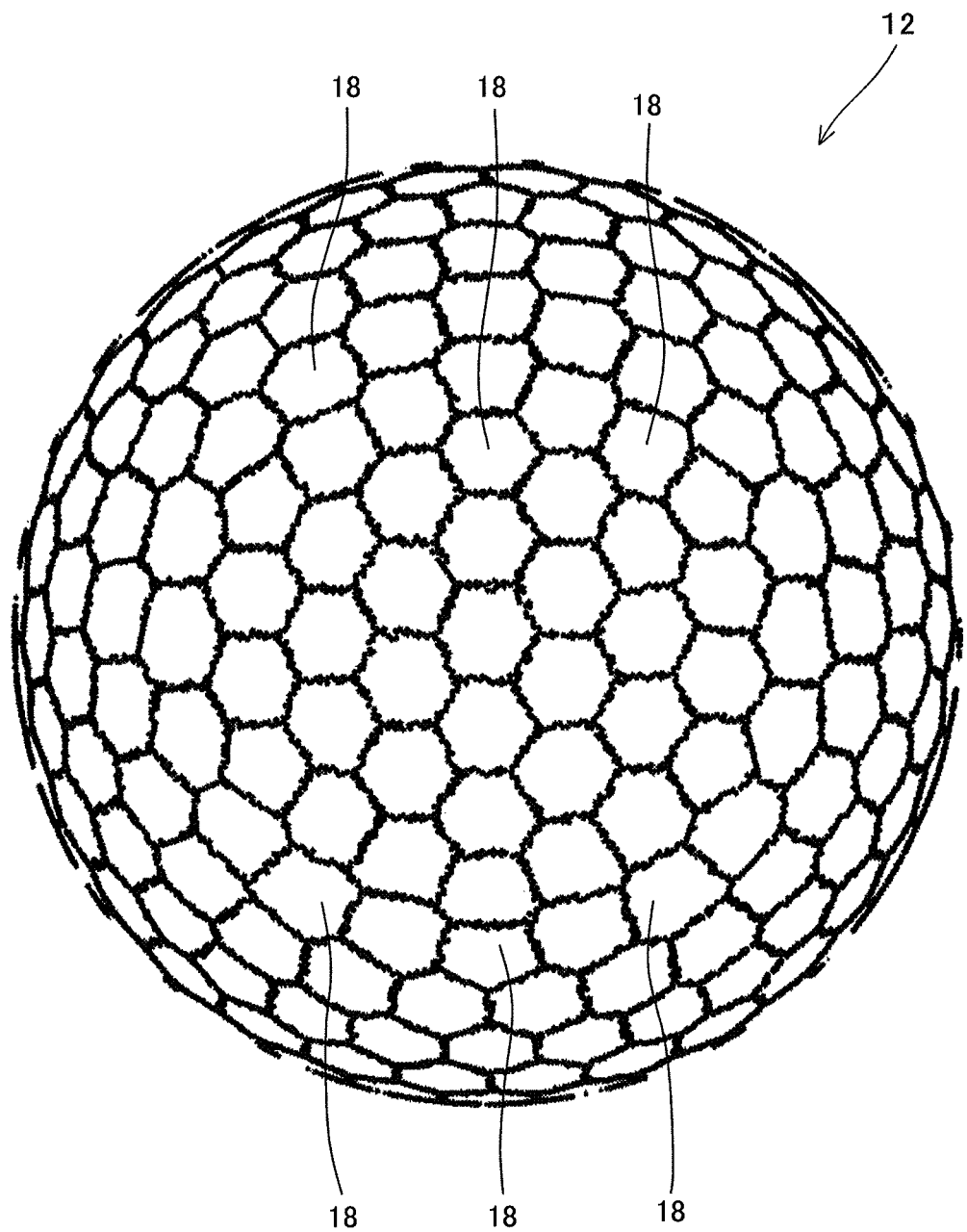
FIG. 11 is a plan view of the phantom sphere in FIG. 10.

For each generating point 16, a set of cells associated with the generating point 16 is assumed. In other words, a set of cells for which this generating point 16 is the closest generating point 16 is assumed. The set is set as a Voronoi region 18. A large number of the Voronoi regions 18 obtained thus are shown in FIGS. 10 and 11. In FIGS. 10 and 11, when another cell adjacent to a certain cell belongs to a Voronoi region 18 different from a Voronoi region 18 to which the certain cell belongs, the certain cell is filled with black.

As is obvious from FIGS. 10 and 11, the contour of each Voronoi region 18 is a zigzag contour. This contour is subjected to smoothing or the like. Typical smoothing is moving averaging. Smoothing by three-point moving average, five-point moving average, seven-point moving average, or the like can be used.

In the three-point moving average, coordinates of the following three cells are averaged:
(1) a cell;
(2) a cell that is closest to the cell in a clockwise direction; and
(3) a cell that is closest to the cell in a counterclockwise direction.

In the five-point moving average, coordinates of the following five cells are averaged:
(1) a cell;
(2) a cell that is closest to the cell in the clockwise direction;
(3) a cell that is closest to the cell in the counterclockwise direction;
(4) a cell that is second closest to the cell in the clockwise direction; and
(5) a cell that is second closest to the cell in the counterclockwise direction.

In the seven-point moving average, coordinates of the following seven cells are averaged:
(1) a cell;
(2) a cell that is closest to the cell in the clockwise direction;
(3) a cell that is closest to the cell in the counterclockwise direction;
(4) a cell that is second closest to the cell in the clockwise direction;
(5) a cell that is second closest to the cell in the counterclockwise direction;
(6) a cell that is third closest to the cell in the clockwise direction; and (7) a cell that is third closest to the cell in the counterclockwise direction.

A plurality of points having the coordinates obtained by the moving average are connected to each other by a spline curve. A loop is obtained by the spline curve. When forming a loop, some of the points may be removed, and a spline curve may be drawn. The loop may be enlarged or reduced in size to obtain a new loop. A land 10 is assigned onto the loop or to the outside of the loop. In other words, a land 10 is assigned to the vicinity of the contour of the Voronoi region 18. Meanwhile, a dimple 8 is assigned to the inside of the loop or onto the loop. In this manner, a rugged pattern shown in FIGS. 2 and 3 is obtained.

In light of flight performance of the golf ball 2, the occupation ratio of the dimples 8 is preferably equal to or greater than 85%, more preferably equal to or greater than 90%, and particularly preferably equal to or greater than 92%. In light of durability of the golf ball 2, the occupation ratio is preferably equal to or less than 98%. In the present embodiment, the occupation ratio is 92%. Use of the Voronoi tessellation achieves a high occupation ratio even when no small dimple 8 is arranged.

As is obvious from FIGS. 2 and 3, the dimples 8 are not orderly arranged in the golf ball 2. The golf ball 2 has a large number of types of dimples 8 whose contour shapes are different from each other. These dimples 8 achieve a superior dimple effect. The number of the types of the dimples 8 is preferably equal to or greater than 50 and particularly preferably equal to or greater than 100. In the present embodiment, each dimple has a contour shape different from those of any other dimples.

In light of suppression of rising of the golf ball 2 during flight, each dimple 8 has a depth of preferably 0.05 mm or greater, more preferably 0.08 mm or greater, and particularly preferably 0.10 mm or greater. In light of suppression of dropping of the golf ball 2 during flight, the depth is preferably equal to or less than 0.60 mm, more preferably equal to or less than 0.45 mm, and particularly preferably equal to or less than 0.40 mm. The depth is the distance between the deepest point of the dimple 8 and the surface of the phantom sphere 12.

In the present invention, the term "dimple volume" means the volume of a part surrounded by the surface of the phantom sphere 12 and the surface of the dimple 8. In light of suppression of rising of the golf ball 2 during flight, the sum of the volumes (total volume) of all the dimples 8 is preferably equal to or greater than 500 mm$^3$, more preferably equal to or greater than 550 mm$^3$, and particularly preferably equal to or greater than 600 mm$^3$. In light of suppression of dropping of the golf ball 2 during flight, the sum is preferably equal to or less than 900 mm$^3$, more preferably equal to or less than 850 mm$^3$, and particularly preferably equal to or less than 800 mm$^3$.

From the standpoint that a fundamental feature of the golf ball 2 being substantially a sphere is not impaired, the total number of the dimples 8 is preferably equal to or greater than 250, more preferably equal to or greater than 280, and particularly preferably equal to or greater than 310. From the standpoint that each dimple 8 can contribute to the dimple effect, the total number is preferably equal to or less than 450, more preferably equal to or less than 400, and particularly preferably equal to or less than 370.

As described above, prior to the Voronoi tessellation, a large number of the circles 14 are assumed on the surface of the phantom sphere 12. From the standpoint that the dimples 8 can be uniformly arranged, it is preferred that the circles 14 are assumed such that one or more of conditions indicated in the following (1) to (4) are met.

(1) Each circle 14 does not intersect other circles 14 adjacent to the circle 14.

(2) The diameter of each circle 14 is equal to or greater than 2.0 mm but equal to or less than 6.0 mm.

(3) The number of the circles 14 is equal to or greater than 280 but equal to or less than 400.

(4) The ratio of the total area of the circles 14 to the area of the surface of the phantom sphere 12 is equal to or greater than 60%.

Preferably, the circles 14 are assumed such that all the conditions indicated in the above (1) to (4) are met.

Figure 12:
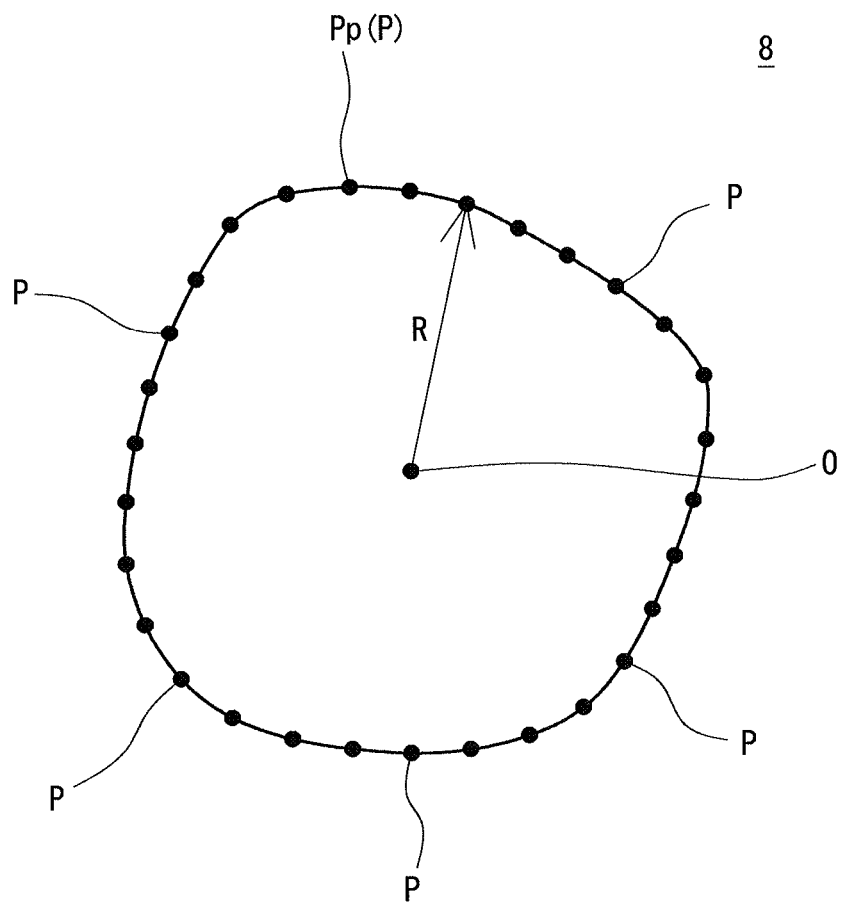
FIG. 12 is an enlarged view of a dimple of the golf ball in FIG. 2.

The golf ball 2 has dimples 8 having a radius variation range Rh of 0.4 mm or greater. A method for calculating a radius variation range Rh is shown in FIG. 12. In this method, 30 points P are assumed on the contour of the dimple 8 such that the length of the contour is divided into 30 equal parts. These points P include a point Pp that is located on the contour of the dimple 8 and closest to a pole. A coordinate of a center O is decided by averaging coordinates of the 30 points P.

Figure 13:
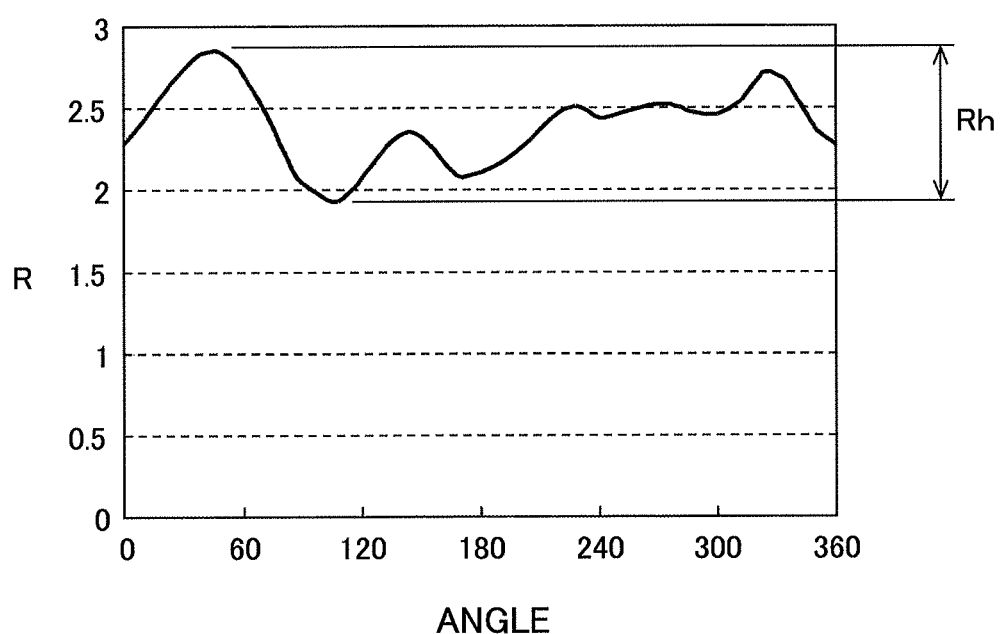
FIG. 13 is a graph for explaining a method for calculating a radius variation range of the dimple in FIG. 12.

After the coordinate of the center O is decided, the distance between the center O and the point P (i.e., a radius R) is calculated. For each point P, the radius R is calculated. FIG. 13 is a graph in which the radius R is plotted. The horizontal axis of the graph indicates an angle of a line connecting the center O to each point, relative to a longitude direction. As shown in the graph, a value obtained by subtracting the minimum value of the radius R from the maximum value of the radius R is the radius variation range Rh. The radius variation range Rh is an index indicating distortion of the dimple 8.

In the golf ball 2 having the dimples 8 having a radius variation range Rh of 0.4 mm or greater, the dimples 8 are not orderly arranged. The golf ball 2 has excellent flight performance. The ratio P1 of the number of the dimples 8 having a radius variation range Rh of 0.4 mm or greater relative to the total number of the dimples 8 is preferably equal to or greater than 30%, more preferably equal to or greater than 50%, and particularly preferably equal to or greater than 70%. The ratio P1 is ideally 100%. In the golf ball 2 shown in FIGS. 2 and 3, the ratio P1 is 81%.

As is obvious from FIG. 13, variation of the radius R of the dimple 8 is not periodic. In the golf ball 2, the dimples 8 are not orderly arranged. The golf ball 2 has excellent flight performance.

In light of flight performance, the difference between the radius variation range Rhmax of the dimple 8 having a maximum radius variation range Rh and the radius variation range Rhmin of the dimple 8 having a minimum radius variation range Rh is preferably equal to or greater than 0.1 mm, more preferably equal to or greater than 0.3 mm, and particularly preferably equal to or greater than 0.5 mm.

In light of flight performance, the standard deviation of the radius variation ranges Rh of all the dimples 8 is preferably equal to or greater than 0.10 and particularly preferably equal to or greater than 0.13.

The golf ball 2 has dimples 8 that meet the following mathematical formula (1).

$$Rh/Rave \geq 0.25 \qquad (1)$$

In this mathematical formula, Rh represents a radius variation range, and Rave represents an average radius. Rave is the average of the radii R at all points that a single dimple 8 has.

In the golf ball 2 that meet the above mathematical formula (1), the dimples 8 are not orderly arranged. The golf ball 2 has excellent flight performance. The ratio P2 of the number of the dimples 8 that meet the above mathematical formula (1), relative to the total number of the dimples 8, is preferably equal to or greater than 10%, more preferably equal to or greater than 20%, and particularly preferably equal to or greater than 30%. The ratio P2 is ideally 100%. In the golf ball 2 shown in FIGS. 2 and 3, the ratio P2 is 36%.

In light of flight performance, it is preferred that the golf ball 2 meets the following mathematical formula (2).

$$(Rh\max - Rh\min) > (R1 - R2) \quad (2)$$

In the mathematical formula, Rhmax represents the radius variation range of the dimple 8 having a maximum radius variation range Rh, Rhmin represents the radius variation range of the dimple 8 having a minimum radius variation range Rh, R1 represents the average radius of the dimple 8 having a maximum radius variation range Rh, and R2 represents the average radius of the dimple 8 having a minimum radius variation range Rh. The difference between (Rhmax−Rhmin) and (R1−R2) is preferably equal to or greater than 0.1 mm, more preferably equal to or greater than 0.2 mm, and particularly preferably equal to or greater than 0.3 mm. In the golf ball 2 shown in FIGS. 2 and 3, the difference is 0.449 mm.

A drag coefficient CD and a lift coefficient CL of the golf ball 2 under 15 conditions are measured through the ITR. A trajectory of the golf ball 2 is calculated by a program created according to the manual provided by the USGA, using the drag coefficient CD and the lift coefficient CL. The following conditions are also inputted to the program.

Ball initial speed of: 57.4 m/s
Launch angle: 13.3°
Initial backspin rate: 2450 rpm In this program, a trajectory is calculated based on a model which is proposed by "S. J. Quintavalla" of the USGA. This model is disclosed in "Science and Golf IV, Chapter 30, A Generally Applicable Model for the Aerodynamic Behavior of Golf Balls" published in 2002.

Figure 14:
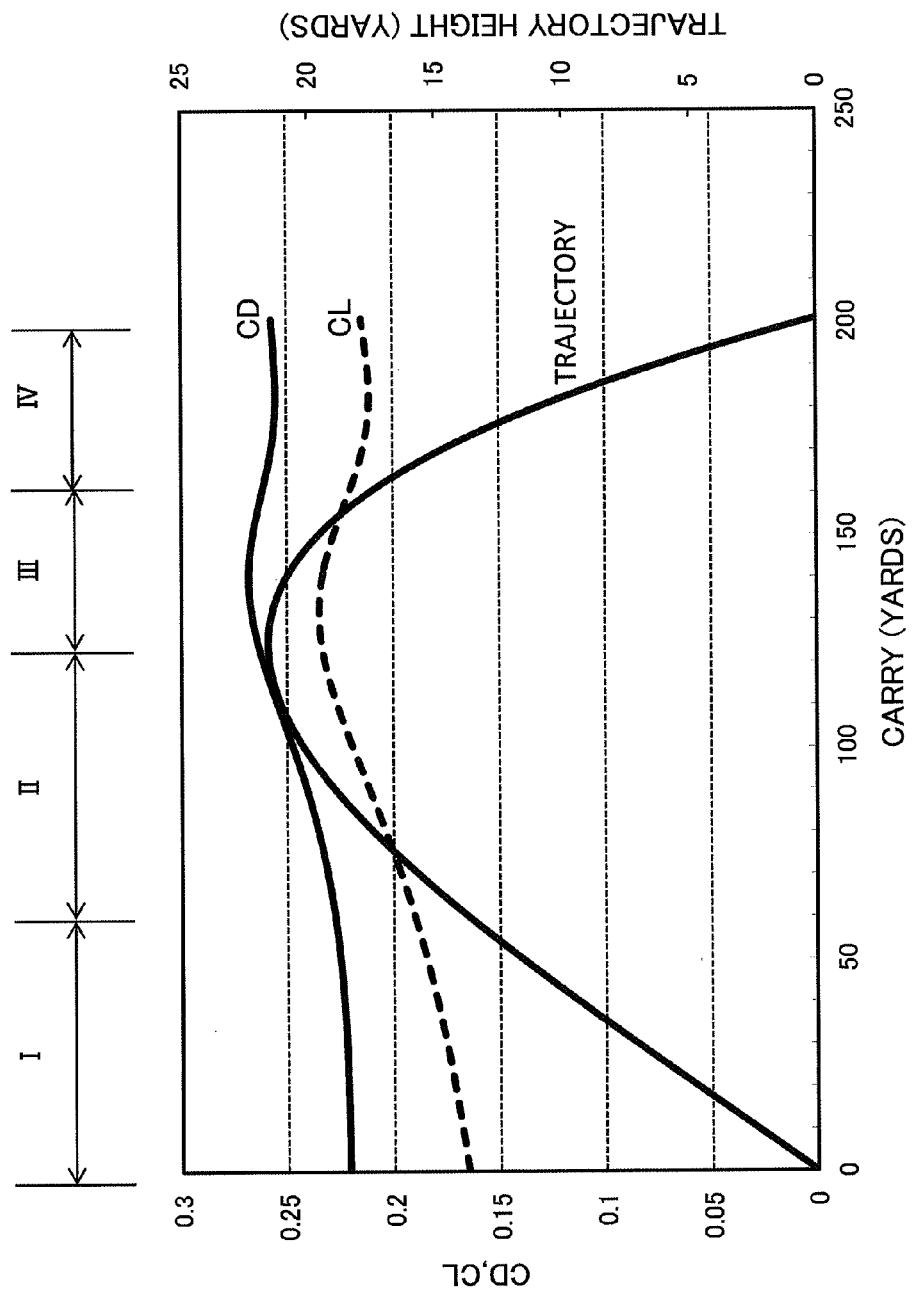
FIG. 14 is a graph showing a trajectory of the golf ball in FIG. 2 with a drag coefficient CD and a lift coefficient CL.

The drag coefficient CD and the lift coefficient CL can be calculated every 5/1000 sec from a launch point to a landing point by the trajectory calculation. A locus, the drag coefficient CD, and the lift coefficient CL which are obtained by the trajectory calculation are shown in FIG. 14. The locus of the trajectory of the golf ball 2 gradually rises from the launch point to the top and gradually falls from the top to the landing point.

In FIG. 14, segments of the trajectory are indicated by reference signs I to IV. What is indicated by the reference sign I is a first segment, what is indicated by the reference sign II is a second segment, what is indicated by the reference sign III is a third segment, and what is indicated by the reference sign IV is a fourth segment. The boundary between the first segment and the second segment is the midpoint between the launch point and the top. The boundary between the second segment and the third segment is the top. The boundary between the third segment and the fourth segment is the midpoint between the top and the landing point. The horizontal distance of the first segment is the same as that of the second segment. The horizontal distance of the third segment is the same as that of the fourth segment.

In the present invention, each of a large number of drag coefficients CD is calculated every 5/1000 sec. In addition, the average of the drag coefficients CD that belong to each segment is calculated. Specifically, the average CD1 of the drag coefficients CD in the first segment, the average CD2 of the drag coefficients CD in the second segment, the average CD3 of the drag coefficients CD in the third segment, and the average CD4 of the drag coefficients CD in the fourth segment are calculated.

In the present invention, each of a large number of lift coefficients CL is calculated every 5/1000 sec. In addition, the average of the lift coefficients CL that belong to each segment is calculated. Specifically, the average CL1 of the lift coefficients CL in the first segment, the average CL2 of the lift coefficients CL in the second segment, the average CL3 of the lift coefficients CL in the third segment, and the average CL4 of the lift coefficients CL in the fourth segment are calculated.

The specifications of golf balls according to Samples 1 to 10 for which averages of the drag coefficients CD and the averages of the lift coefficients CL are calculated are shown in Table 1 below.

TABLE 1

Specifications of Golf Balls

Figure 15:
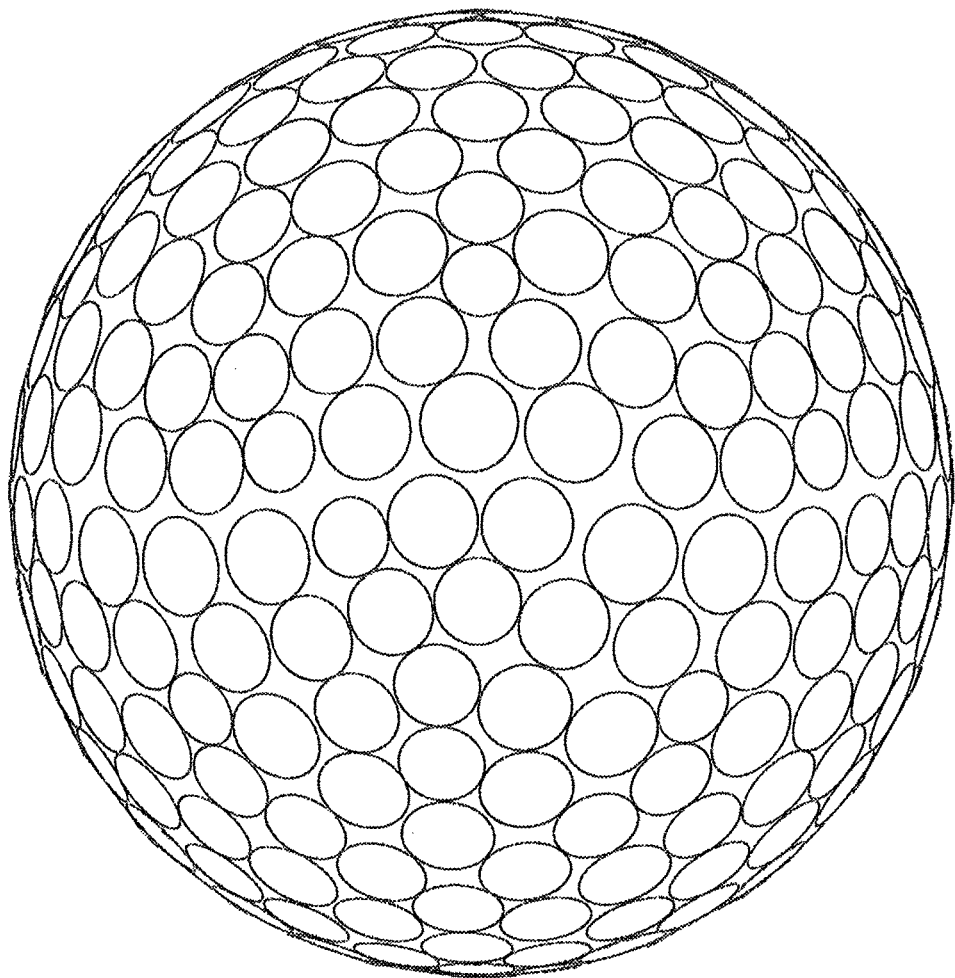
FIG. 15 is a front view of a golf ball having a pattern A.
Figure 16:
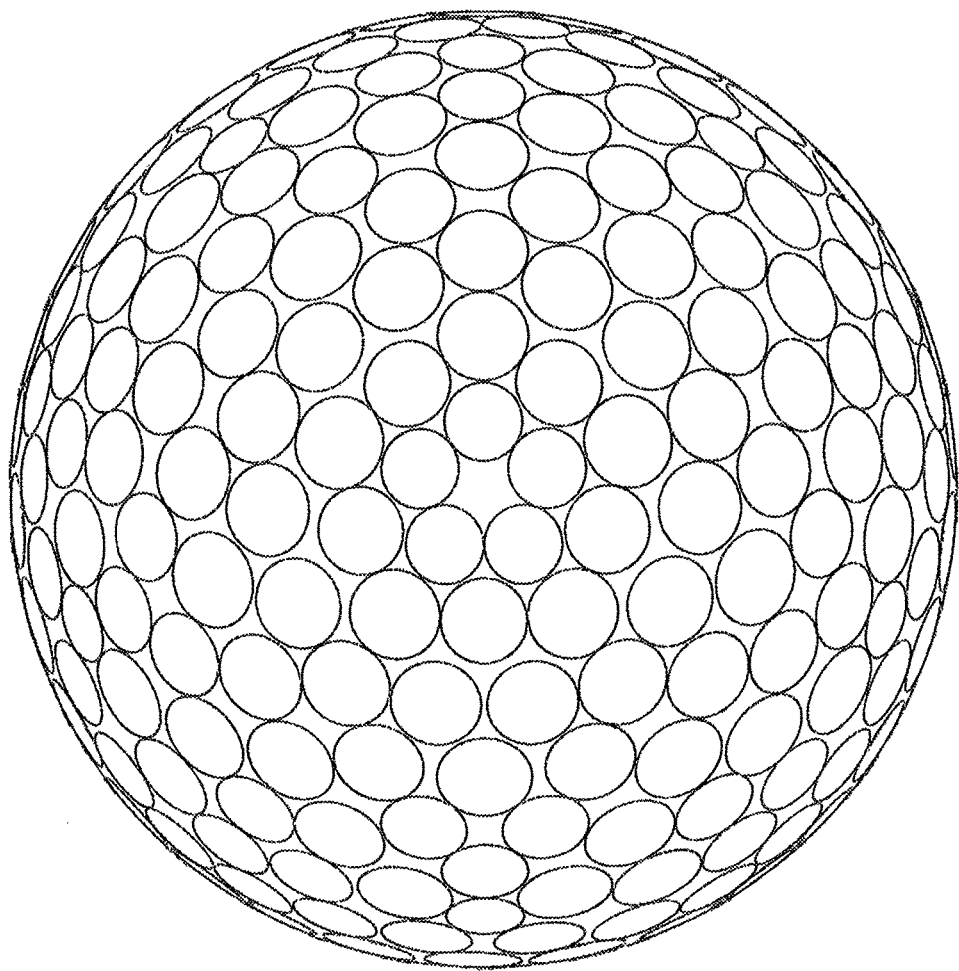
FIG. 16 is a plan view of the golf ball in FIG. 15.
Figure 17:
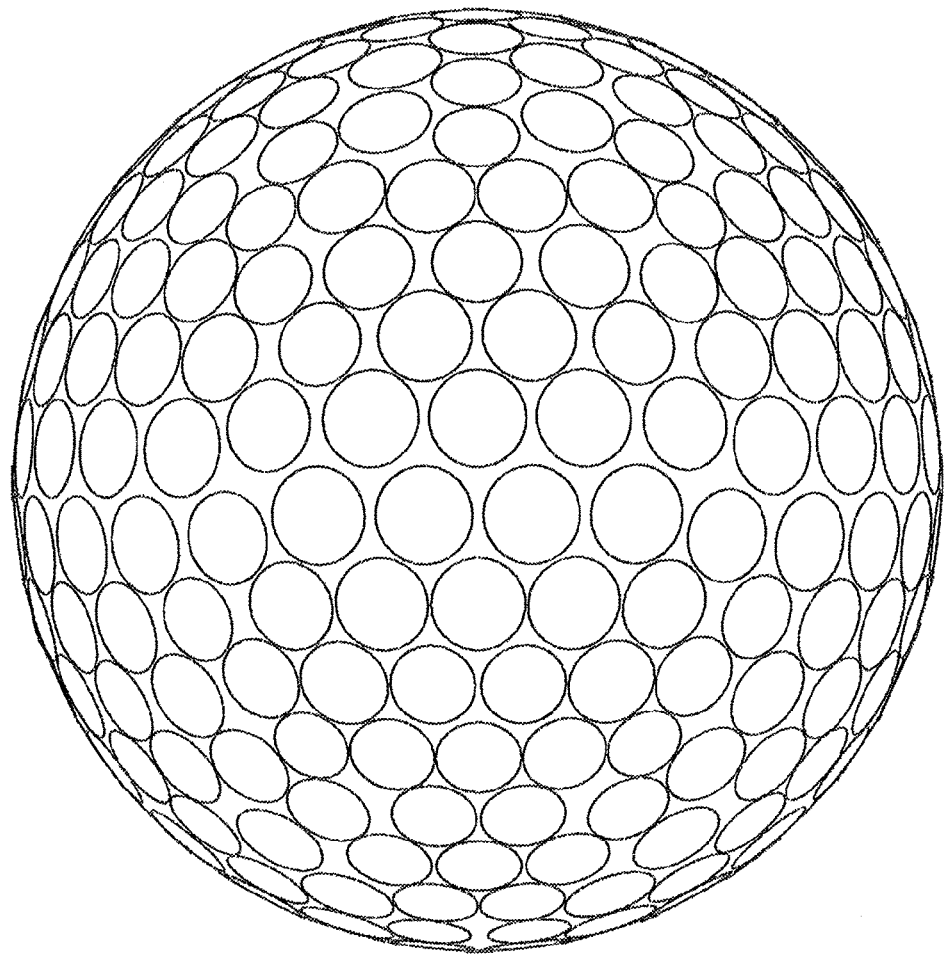
FIG. 17 is a front view of a golf ball having a pattern B.
Figure 18:
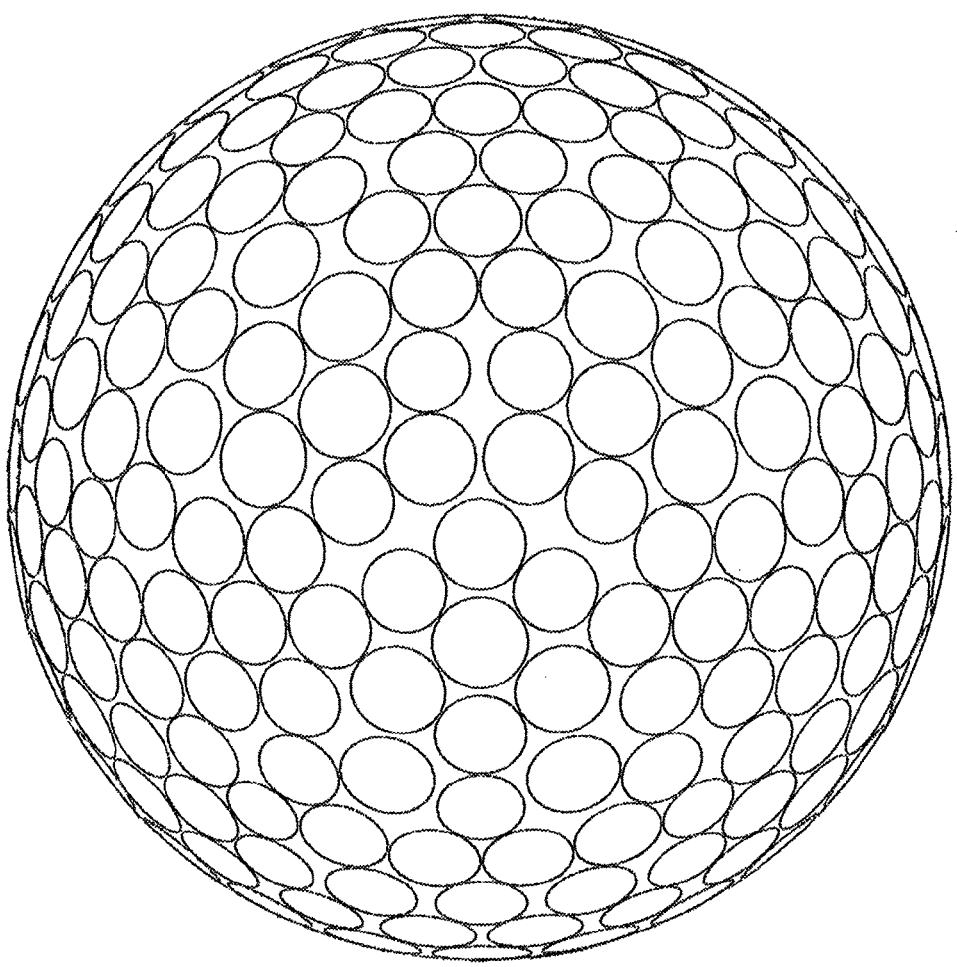
FIG. 18 is a plan view of the golf ball in FIG. 17.

|  | Pattern | Front view | Plan view | Total volume (mm$^3$) |
|---|---|---|---|---|
| Sample 1 | A | FIG. 15 | FIG. 16 | 532 |
| Sample 2 | A | FIG. 15 | FIG. 16 | 552 |
| Sample 3 | A | FIG. 15 | FIG. 16 | 572 |
| Sample 4 | B | FIG. 17 | FIG. 18 | 536 |
| Sample 5 | B | FIG. 17 | FIG. 18 | 556 |
| Sample 6 | B | FIG. 17 | FIG. 18 | 576 |
| Sample 7 | C | FIG. 2 | FIG. 3 | 670 |
| Sample 8 | C | FIG. 2 | FIG. 3 | 690 |
| Sample 9 | C | FIG. 2 | FIG. 3 | 710 |
| Sample 10 | C | FIG. 2 | FIG. 3 | 730 |

Figure 19:
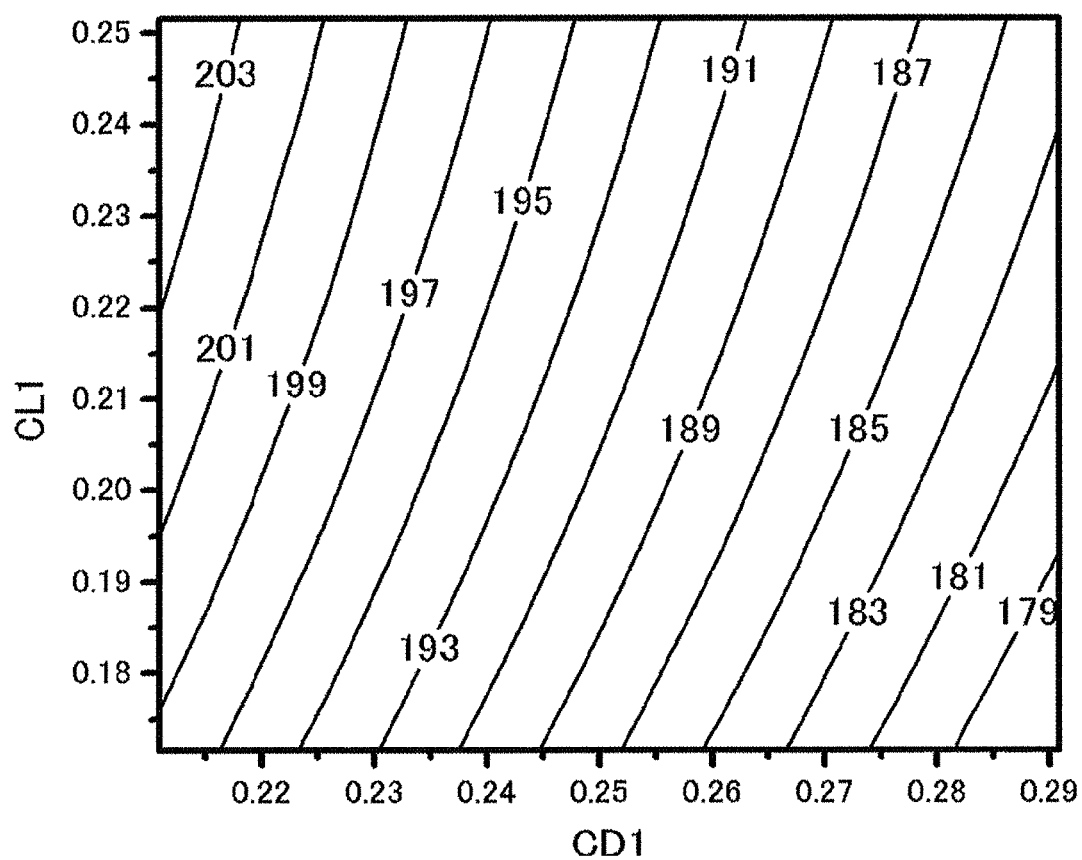
FIG. 19 is a graph showing an aerodynamic map in a first segment.
Figure 20:
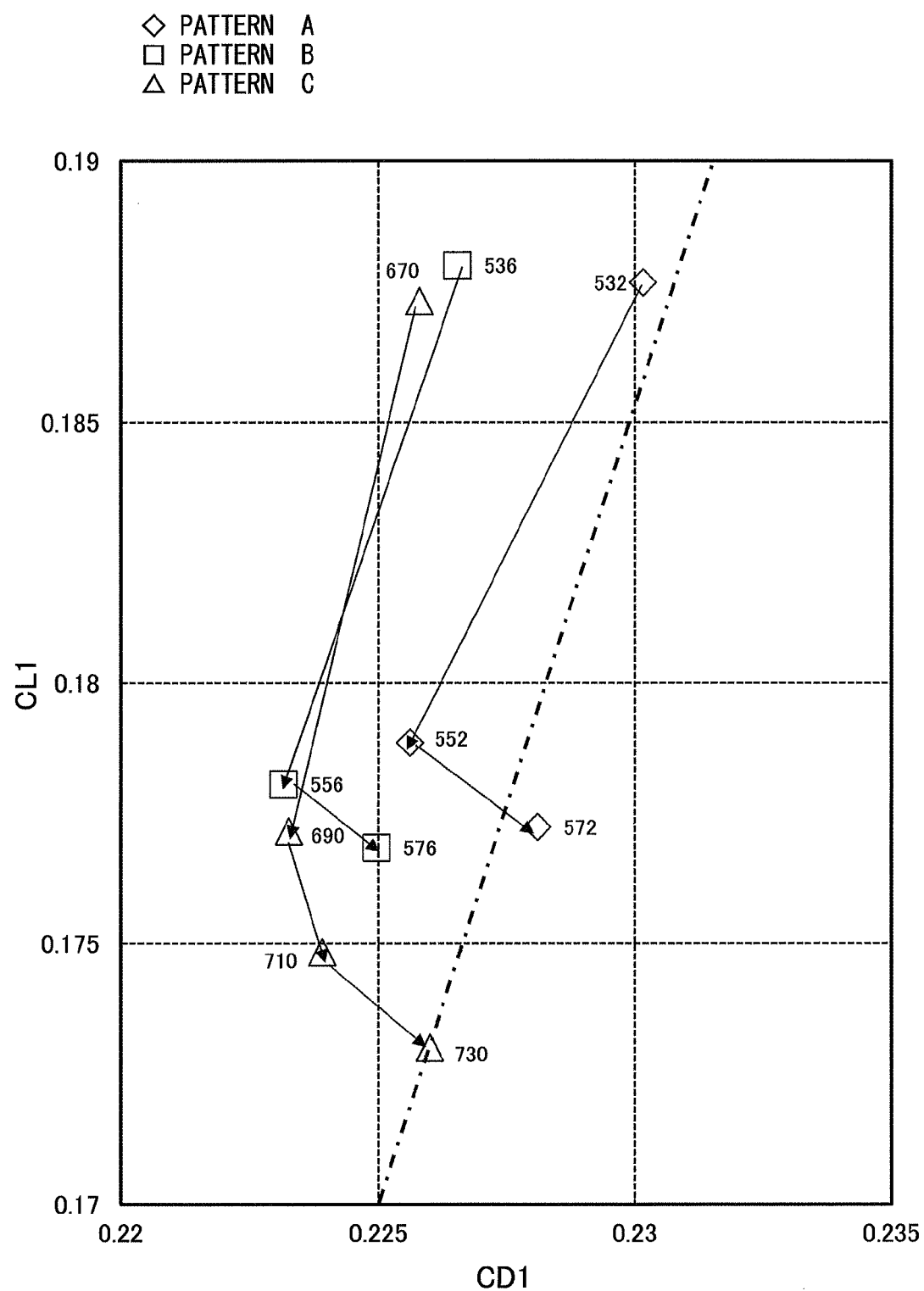
FIG. 20 is a graph showing another aerodynamic map in the first segment.

Trajectory calculation is performed with changing the average CD1 and the average CL1 in the first segment of the golf ball according to Sample 2 in the above Table 1, and flight distances are calculated. Contour lines for the flight distances are shown in an aerodynamic map in FIG. 19. The gradients of the contour lines are identified from the aerodynamic map. The gradients of the contour lines are substantially the same as those in the first segment of another golf ball when a ball initial speed, a launch angle, and an initial backspin rate are the same therebetween. Therefore, the gradients can be universally used as gradients of a general golf ball. FIG. 20 shows another aerodynamic map. In FIG. 20, the horizontal axis indicates the average CD1 in the first segment, and the vertical axis indicates the average CL1 in the first segment. In FIG. 20, the averages CD1 and the averages CL1 of the golf balls according to Samples 1 to 10 are plotted. What is indicated by an alternate long and short dash line in FIG. 20 is the contour line for the flight distance. A golf ball that is located on the left side of the contour line and whose distance to the contour line is large has excellent flight performance.

Figure 21:
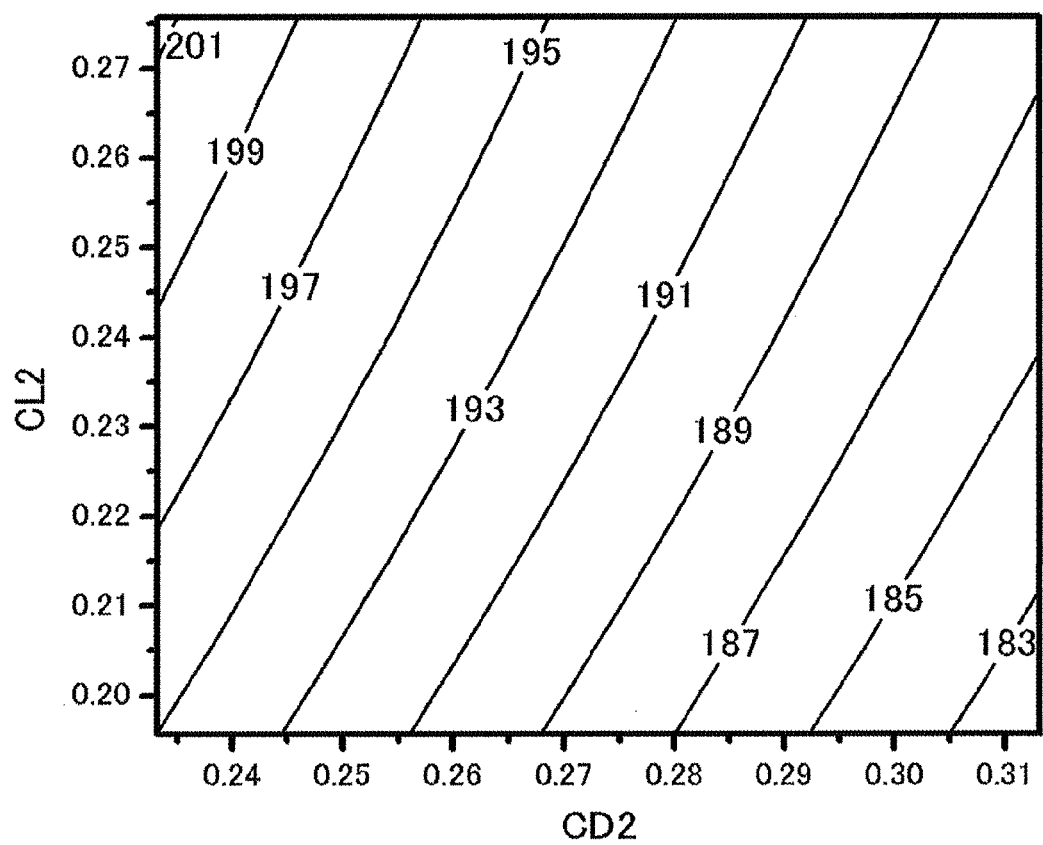
FIG. 21 is a graph showing an aerodynamic map in a second segment.
Figure 22:
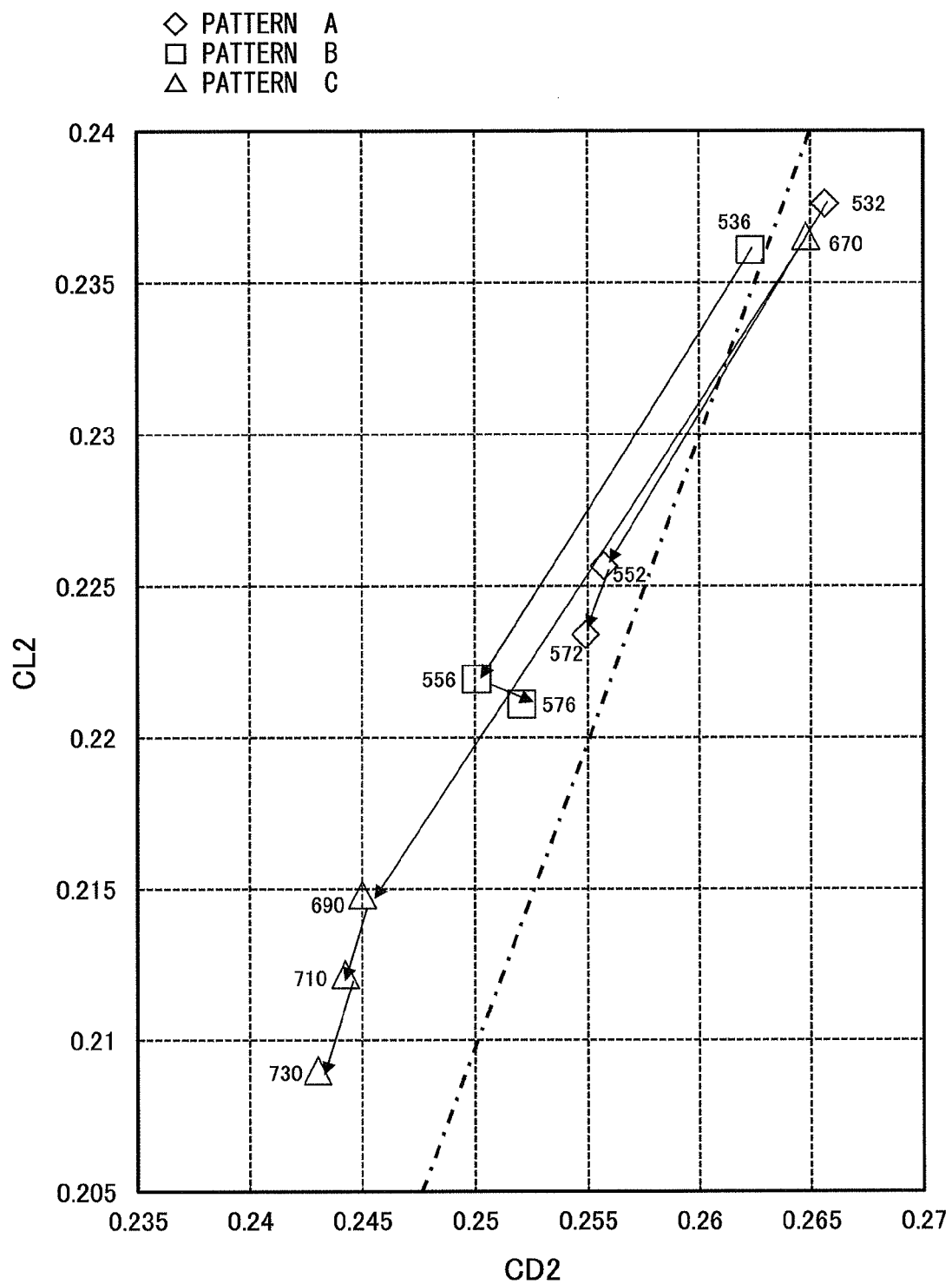
FIG. 22 is a graph showing another aerodynamic map in the second segment.

Trajectory calculation is performed with changing the average CD2 and the average CL2 in the second segment of the golf ball according to Sample 2 in the above Table 1, and flight distances are calculated. Contour lines for the flight distances are shown in an aerodynamic map in FIG. 21. The gradients of the contour lines are identified from the aerodynamic map. The gradients of the contour lines are substantially the same as those in the second segment of another golf ball when a ball initial speed, a launch angle, and an initial backspin rate are the same therebetween. Therefore, the gradients can be universally used as gradients of a general golf ball. FIG. 22 shows another aerodynamic map. In FIG. 22, the horizontal axis indicates the average CD2 in the second segment, and the vertical axis indicates the average CL2 in the second segment. In FIG. 22, the averages CD2 and the averages CL2 of the golf balls according to Samples 1 to 10 are plotted. What is indicated by an alternate long and short dash line in FIG. 22 is the contour line for the flight distance. A golf ball that is located on the left side of the contour line and whose distance to the contour line is large has excellent flight performance.

Figure 23:
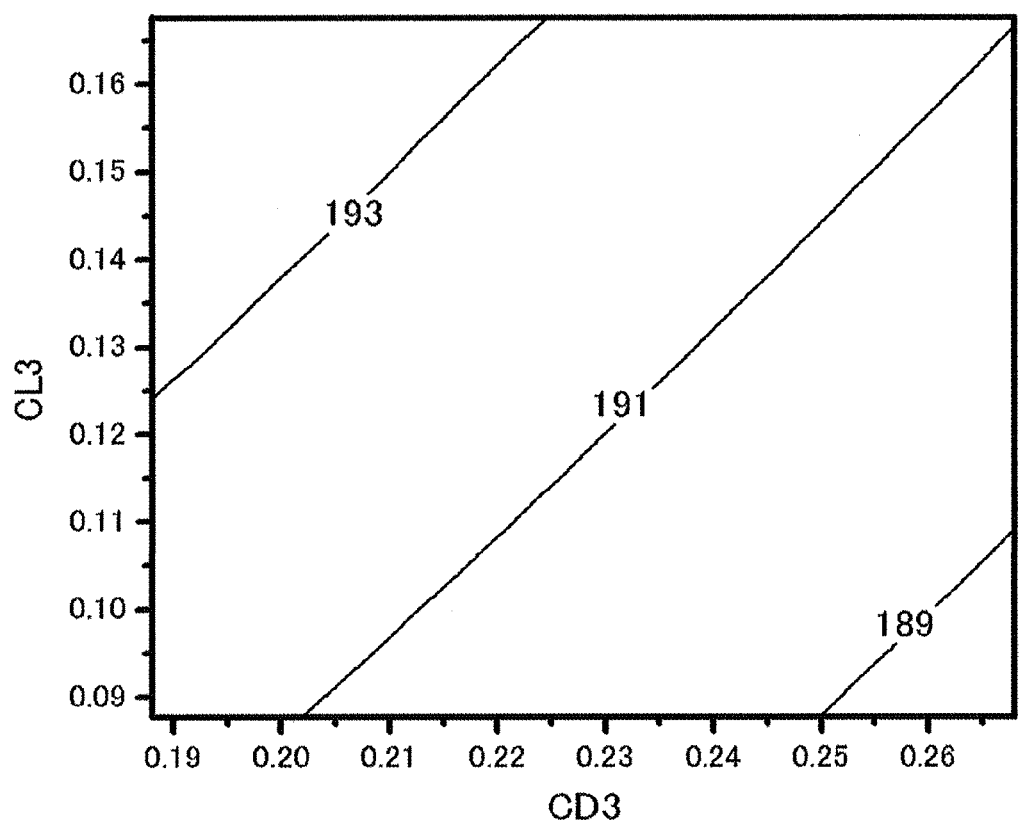
FIG. 23 is a graph showing an aerodynamic map in a third segment.
Figure 24:
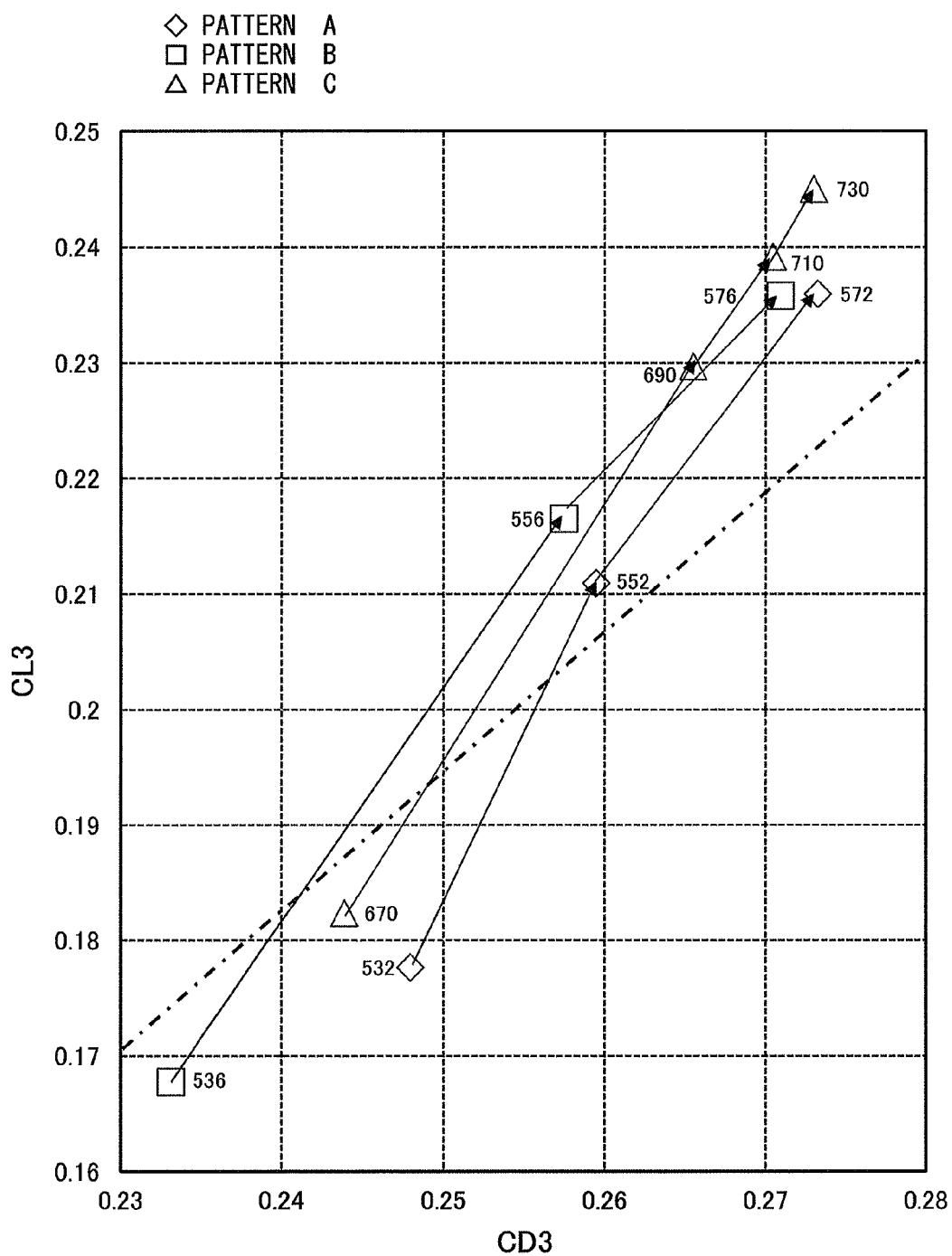
FIG. 24 is a graph showing another aerodynamic map in the third segment.

Trajectory calculation is performed with changing the average CD3 and the average CL3 in the third segment of the golf ball according to Sample 2 in the above Table 1, and flight distances are calculated. Contour lines for the flight distances are shown in an aerodynamic map in FIG. 23. The gradients of the contour lines are identified from the aerodynamic map. The gradients of the contour lines are substantially the same as those in the third segment of another golf ball when a ball initial speed, a launch angle, and an initial backspin rate are the same therebetween. Therefore, the gradients can be universally used as gradients of a general golf ball. FIG. 24 shows another aerodynamic map. In FIG. 24, the horizontal axis indicates the average CD3 in the third segment, and the vertical axis indicates the average CL3 in the third segment. In FIG. 24, the averages CD3 and the averages CL3 of the golf balls according to Samples 1 to 10 are plotted. What is indicated by an alternate long and short dash line in FIG. 24 is the contour line for the flight distance. A golf ball that is located on the left side of the contour line and whose distance to the contour line is large has excellent flight performance.

Figure 25:
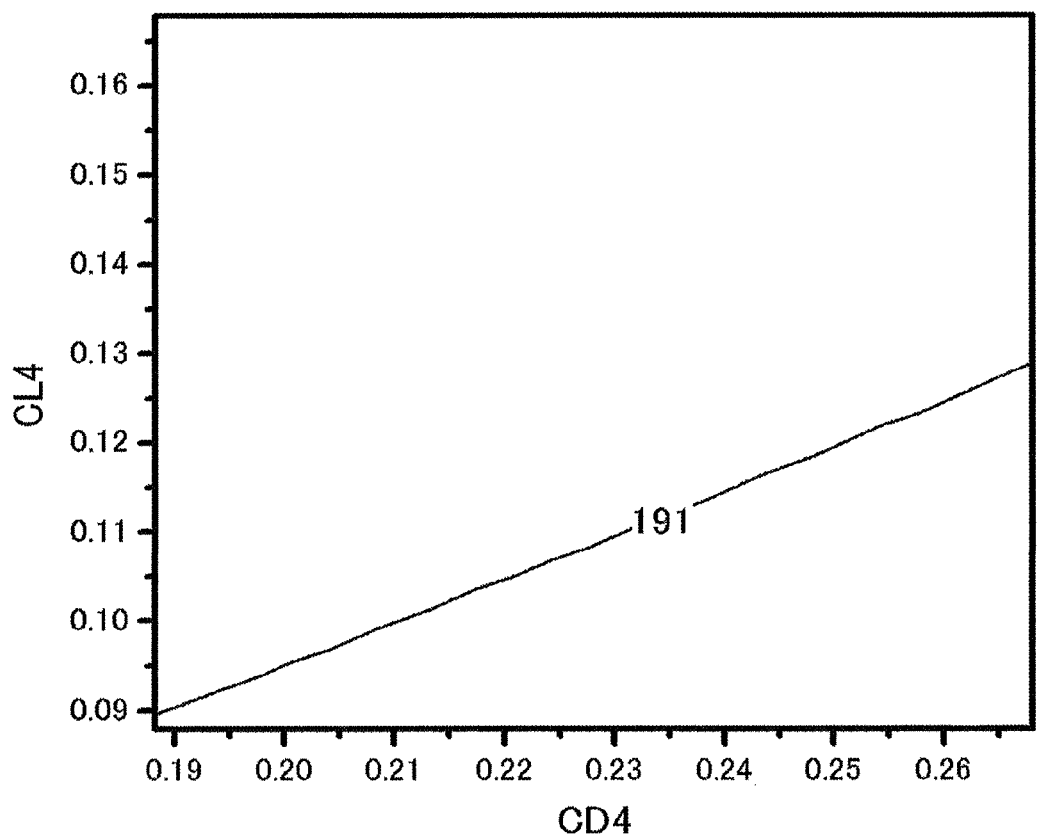
FIG. 25 is a graph showing an aerodynamic map in a fourth segment.
Figure 26:
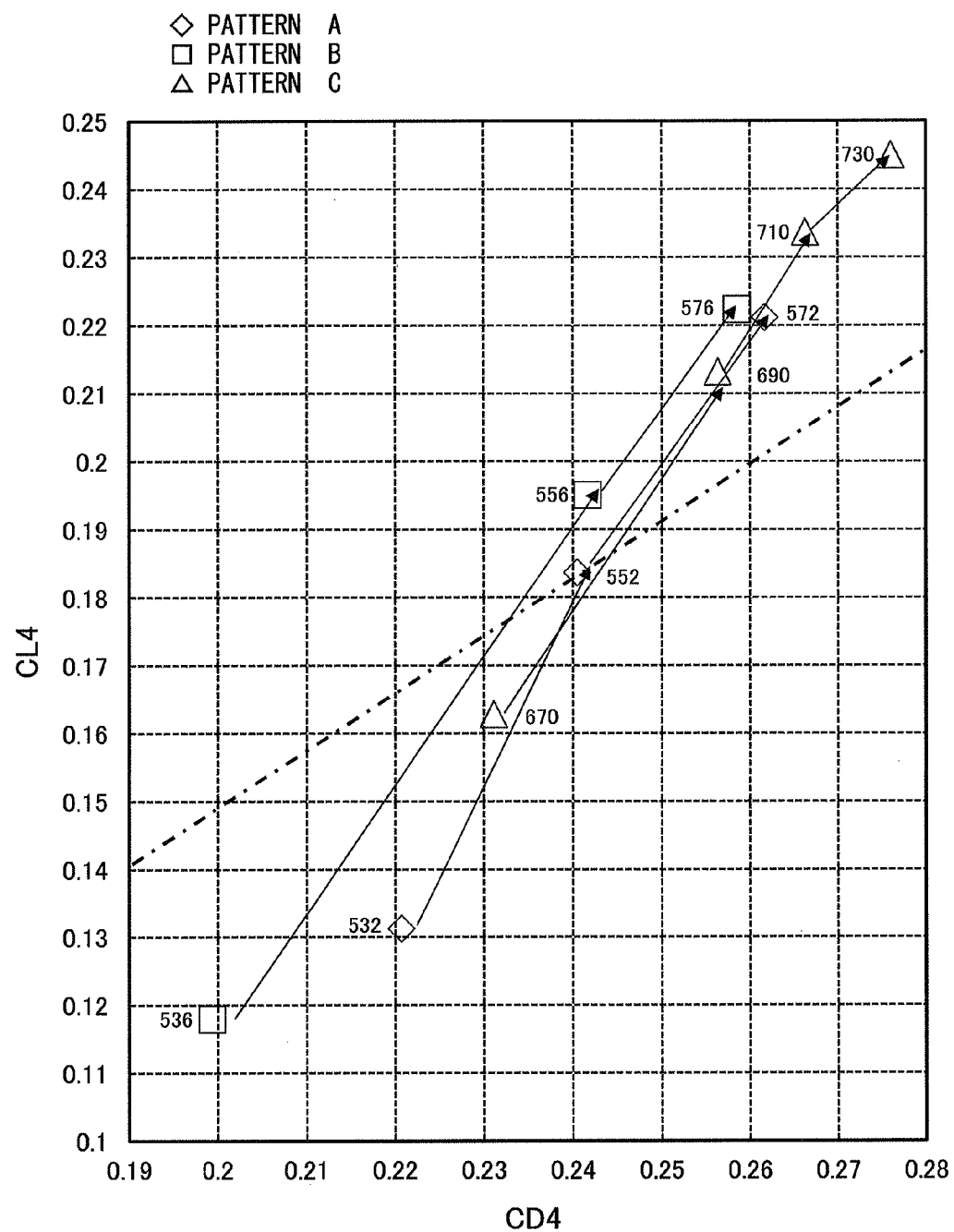
FIG. 26 is a graph showing another aerodynamic map in the fourth segment.

Trajectory calculation is performed with changing the average CD4 and the average CL4 in the fourth segment of the golf ball according to Sample 2 in the above Table 1, and flight distances are calculated. A contour line for the flight distance is shown in an aerodynamic map in FIG. 25. The gradient of the contour line is identified from the aerodynamic map. The gradient of the contour line is substantially the same as that in the fourth segment of another golf ball when a ball initial speed, a launch angle, and an initial backspin rate are the same therebetween. Therefore, the gradient can be universally used as a gradient of a general golf ball. FIG. 26 shows another aerodynamic map. In FIG. 26, the horizontal axis indicates the average CD4 in the fourth segment, and the vertical axis indicates the average CL4 in the fourth segment. In FIG. 26, the averages CD4 and the averages CL4 of the golf balls according to Samples 1 to 10 are plotted. What is indicated by an alternate long and short dash line in FIG. 26 is a contour line for the flight distance. A golf ball that is located on the left side of the contour line and whose distance to the contour line is large has excellent flight performance.

From FIGS. 20 and 22, it is recognized that a golf ball of which the drag coefficients CD and the lift coefficients CL in the first segment and the second segment are low has excellent flight performance. From FIGS. 24 and 26, it is recognized that a golf bail of which the drag coefficients CD and the lift coefficients CL in the third segment and the fourth segment are high has excellent flight performance.

In light of flight performance, the average CD1 of the drag coefficients CD in the first segment is preferably equal to or less than 0.225, more preferably equal to or less than 0.224, and particularly preferably equal to or less than 0.223. In light of flight performance, the average CL1 of the lift coefficients CL in the first segment is preferably equal to or less than 0.180, more preferably equal to or less than 0.177, and particularly preferably equal to or less than 0.175.

In light of flight performance, the average CD2 of the drag coefficients CD in the second segment is preferably equal to or less than 0.250, more preferably equal to or less than 0.245, and particularly preferably equal to or less than 0.244. In light of flight performance, the average CL2 of the lift coefficients CL in the second segment is preferably equal to or less than 0.220, more preferably equal to or less than 0.215, and particularly preferably equal to or less than 0.212.

In light of flight performance, the average CD3 of the drag coefficients CD in the third segment is preferably equal to or greater than 0.260, more preferably equal to or greater than 0.265, and particularly preferably equal to or greater than 0.270. In light of flight performance, the average CL3 of the lift coefficients CL in the third segment is preferably equal to or greater than 0.220, more preferably equal to or greater than 0.230, and particularly preferably equal to or greater than 0.239.

In light of flight performance, the average CD4 of the drag coefficients CD in the fourth segment is preferably equal to or greater than 0.250, more preferably equal to or greater than 0.256, and particularly preferably equal to or greater than 0.266. In light of flight performance, the average CL4 of the lift coefficients CL in the fourth segment is preferably equal to or greater than 0.200, more preferably equal to or greater than 0.213, and particularly preferably equal to or greater than 0.234.

EXAMPLES

Example 1

A rubber composition was obtained by kneading 100 parts by weight of a polybutadiene (trade name "BR-730", manufactured by JSR Corporation), 30 parts by weight of zinc diacrylate, 6 parts by weight of zinc oxide, 10 parts by weight of barium sulfate, 0.5 parts by weight of diphenyl disulfide, and 0.5 parts by weight of dicumyl peroxide. This rubber composition was placed into a mold including upper and lower mold halves each having a hemispherical cavity, and heated at 170° C. for 18 minutes to obtain a core with a diameter of 39.7 mm. Meanwhile, a resin composition was obtained by kneading 50 parts by weight of an ionomer resin (trade name "Himilan 1605", manufactured by Du Pont-MITSUI POLYCHEMICALS Co., LTD.), 50 parts by weight of another ionomer resin (trade name "Himilan 1706", manufactured by Du Pont-MITSUI POLYCHEMICALS Co., LTD.), and 3 parts by weight of titanium dioxide. The above core was placed into a final mold having a large number of pimples on its inside face, and the above resin composition was injected around the core by injection molding to form a cover with a thickness of 1.5 mm. A large number of dimples having a shape that is the inverted shape of the pimples were formed on the cover. A clear paint including a two-component curing type polyurethane as a base material was applied to this cover to obtain a golf ball of Example 1 with a diameter of 42.7 mm and a weight of about 45.4 g. The golf ball has a PGA compression of about 85. The golf ball has a dimple pattern shown in FIGS. 2 and 3. The occupation ratio of the golf ball is 92%. The total volume of the dimples of the golf ball is 690 mm$^3$.

Example 2 and Comparative Examples 1 to 8

Golf balls of Example 2 and Comparative Examples 1 to 8 were obtained in the same manner as Example 1, except the final mold was changed. The specifications of the dimples of these golf balls are shown in Tables 2 and 3 below.

[Flight Distance Test]

Trajectory calculation was performed using aerodynamic characteristic values obtained through an ITR test. The conditions for the trajectory calculation are as follows.

Ball initial speed: 57.4 m/s

Launch angle: 13.3°

Initial backspin rate: 2450 rpm

The average, in each segment, of the drag coefficients CD obtained by the trajectory calculation is shown in Tables 2 and 3 below. The average, in each segment, of the lift coefficients CL obtained by the trajectory calculation is shown in Tables 2 and 3 below. In addition, the flight distance (carry) obtained by the trajectory calculation is shown in Tables 2 and 3 below. The flight distance is the distance from the launch point to the landing point.

TABLE 2

Results of Evaluation

|  | Comp. Example 1 | Comp. Example 2 | Comp. Example 3 | Comp. Example 4 | Comp. Example 5 |
|---|---|---|---|---|---|
| Pattern | A | A | A | B | B |
| Front view | FIG. 15 | FIG. 15 | FIG. 15 | FIG. 17 | FIG. 17 |
| Plan view | FIG. 16 | FIG. 16 | FIG. 16 | FIG. 18 | FIG. 18 |
| Total volume (mm³) | 532 | 552 | 572 | 536 | 556 |
| CD1 | 0.230 | 0.226 | 0.228 | 0.227 | 0.223 |
| CL1 | 0.188 | 0.179 | 0.177 | 0.188 | 0.178 |
| CD2 | 0.266 | 0.256 | 0.255 | 0.262 | 0.250 |
| CL2 | 0.238 | 0.226 | 0.223 | 0.236 | 0.222 |
| CD3 | 0.248 | 0.259 | 0.273 | 0.233 | 0.257 |
| CL3 | 0.178 | 0.211 | 0.236 | 0.168 | 0.216 |
| CD4 | 0.221 | 0.240 | 0.262 | 0.199 | 0.242 |
| CL4 | 0.131 | 0.184 | 0.221 | 0.118 | 0.195 |
| Carry (yard) | 197.59 | 199.35 | 199.08 | 199.26 | 200.79 |

TABLE 3

Results of Evaluation

|  | Comp. Example 6 | Comp. Example 7 | Example 1 | Example 2 | Comp. Example 8 |
|---|---|---|---|---|---|
| Pattern | B | C | C | C | C |
| Front view | FIG. 17 | FIG. 2 | FIG. 2 | FIG. 2 | FIG. 2 |
| Plan view | FIG. 18 | FIG. 3 | FIG. 3 | FIG. 3 | FIG. 3 |
| Total volume (mm³) | 576 | 670 | 690 | 710 | 730 |
| CD1 | 0.225 | 0.226 | 0.223 | 0.224 | 0.226 |
| CL1 | 0.177 | 0.187 | 0.177 | 0.175 | 0.173 |
| CD2 | 0.252 | 0.265 | 0.245 | 0.244 | 0.243 |
| CL2 | 0.221 | 0.237 | 0.215 | 0.212 | 0.209 |
| CD3 | 0.271 | 0.244 | 0.265 | 0.270 | 0.273 |
| CL3 | 0.236 | 0.182 | 0.230 | 0.239 | 0.245 |
| CD4 | 0.259 | 0.231 | 0.256 | 0.266 | 0.276 |
| CL4 | 0.222 | 0.163 | 0.213 | 0.234 | 0.245 |
| Carry (yard) | 200.22 | 198.71 | 200.91 | 200.90 | 200.50 |

As shown in Tables 2 and 3, the golf ball of each Example has excellent flight performance. From the results of evaluation, advantages of the present invention are clear.

The dimple pattern described above is applicable to a one-piece golf ball, a multi-piece golf ball, and a thread-wound golf ball, in addition to a two-piece golf ball. The above descriptions are merely illustrative examples, and various modifications can be made without departing from the principles of the present invention.

What is claimed is:

1. A golf ball having a large number of dimples on a surface thereof, wherein
when a trajectory that is calculated under conditions of a ball initial speed of 57.4 m/s, a launch angle of 13.8°, and an initial backspin rate of 2450 rpm by a program created according to a manual provided by the USGA using a drag coefficient CD and a lift coefficient CL obtained through an ITR, is divided into a first segment from a launch point to a midpoint between the launch point and a top, a second segment from the midpoint between the launch point and the top to the top, a third segment from the top to a midpoint between the top and a landing point, and a fourth segment from the midpoint between the top and the landing point to the landing point,
an average CD1 of drag coefficients CD in the first segment is equal to or less than 0.225,
an average CL1 of lift coefficients CL in the first segment is equal to or less than 0.180,
an average CD2 of drag coefficients CD in the second segment is equal to or less than 0.250,
an average CL2 of lift coefficients CL in the second segment is equal to or less than 0.220,
an average CD3 of drag coefficients CD in the third segment is equal to or greater than 0.260,
an average CL3 of lift coefficients CL in the third segment is equal to or greater than 0.220,
an average CD4 of drag coefficients CD in the fourth segment is equal to or greater than 0.250, and
an average CL4 of lift coefficients CL in the fourth segment is equal to or greater than 0.200,
each dimple has a contour shape that is non-circular, and
the golf ball satisfies the following mathematical formula:

$$(Rh\text{max}-Rh\text{min})>(R1-R2),$$

wherein, in the mathematical formula, Rhmax represents a radius variation range of a dimple having a maximum radius variation range Rh, Rhmin represents a radius variation range of a dimple having a minimum radius variation range Rh, R1 represents an average radius of the dimple having a maximum radius variation range Rh, and R2 represents an average radius of the dimple having a minimum radius variation range Rh.

2. The golf ball according to claim 1, wherein each dimple is obtained based on a contour of a Voronoi region assumed on a surface of a phantom sphere of the golf ball.

3. The golf ball according to claim 2, wherein a pattern of the dimples is obtained by a designing process comprising the steps of:
(1) assuming a large number of circles on the surface of the phantom sphere;
(2) assuming a large number of generating points based on positions of the large number of circles;
(3) assuming a large number of Voronoi regions on the surface of the phantom sphere by a Voronoi tessellation based on the large number of generating points; and
(4) assigning a dimple and a land to the surface of the phantom sphere based on contours of the large number of Voronoi regions.

4. The golf ball according to claim 1, wherein a radius variation range Rh of each dimple is equal to or greater than 0.4 mm.

5. The golf ball according to claim 1, wherein each dimple meets the following mathematical formula:

$$Rh/Rave \geq 0.25,$$

wherein, in the mathematical formula, Rh represents a radius variation range, and Rave represents an average radius.

6. The golf ball according to claim 1, wherein a difference between a radius variation range Rhmax of a dimple having a maximum radius variation range Rh and a radius variation range Rhmin of a dimple having a minimum radius variation range Rh is equal to or greater than 0.1 mm.

\* \* \* \* \*